(12) United States Patent
Rivellini et al.

(10) Patent No.: US 10,315,828 B2
(45) Date of Patent: Jun. 11, 2019

(54) ACTIVE SURFACE PROTECTION FOR PORTABLE ELECTRONIC DEVICES

(71) Applicant: Apple Inc., Cupertino, CA (US)

(72) Inventors: Tommaso P. Rivellini, Cupertino, CA (US); Richard H. Koch, Cupertino, CA (US); Zhipeng Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 302 days.

(21) Appl. No.: 15/181,615

(22) Filed: Jun. 14, 2016

(65) Prior Publication Data

US 2017/0355507 A1  Dec. 14, 2017

(51) Int. Cl.

| G01F 15/08 | (2006.01) |
|---|---|
| B65D 81/05 | (2006.01) |
| H01F 7/06 | (2006.01) |
| H04B 1/3888 | (2015.01) |
| G06F 1/16 | (2006.01) |
| H02H 6/00 | (2006.01) |
| H02H 7/20 | (2006.01) |

(52) U.S. Cl.
CPC ........... *B65D 81/054* (2013.01); *H01F 7/064* (2013.01); *H04B 1/3888* (2013.01); *G01F 15/08* (2013.01); *G06F 1/1656* (2013.01); *H02H 6/00* (2013.01); *H02H 7/20* (2013.01)

(58) Field of Classification Search
USPC ........................................ 361/139, 144, 160
See application file for complete search history.

(56) References Cited

U.S. PATENT DOCUMENTS

| 7,059,182 | B1 | 6/2006 | Ragner | |
|---|---|---|---|---|
| 8,330,305 | B2 | 12/2012 | Hart et al. | |
| 8,718,731 | B1 | 5/2014 | Tang | |
| 9,116,668 | B2 | 8/2015 | Xiaozhuo et al. | |
| 9,459,662 | B2 | 10/2016 | Senatori | |
| 2015/0301565 | A1* | 10/2015 | Manullang | G06F 1/182 361/679.26 |
| 2015/0331456 | A1* | 11/2015 | Moon | G06F 1/1656 361/51 |

* cited by examiner

*Primary Examiner* — Danny Nguyen

(57) ABSTRACT

A portable electronic device includes one or more bumpers that are operable to transition between a stowed position and a deployed position. In the deployed position, the bumpers may be proud of one or more surfaces of the portable electronic device that the bumpers are not proud of in the stowed position. The bumpers may protect the surfaces from impact when proud of those surfaces if the portable electronic device contacts a surface, such as when the portable electronic device is dropped. The bumpers may form portions of side corners or other portions of the portable electronic device in the stowed position. In transitioning from the stowed position to the deployed position, the bumpers may rotate and/or translate.

16 Claims, 25 Drawing Sheets

ACTIVE SURFACE PROTECTION FOR PORTABLE ELECTRONIC DEVICES

FIELD

The described embodiments relate generally to protecting portable electronic devices. More particularly, the present embodiments relate to active mechanisms for protecting portable electronic devices.

BACKGROUND

Advances in electronic devices have allowed many electronic devices to be portable. Such portable electronic devices may include smart phones, tablet computing devices, mobile computing devices, and so on. This is convenient for users as the users may take such portable electronic devices with them rather than having to go to a particular location for access.

However, portable electronic devices are, by their nature, subject to an increased risk of damage. For example, because portable electronic devices are commonly carried, they are relatively frequently dropped. Impacts from being dropped may damage sensitive components, such as cover glasses or other display elements, housings, batteries, and so on.

SUMMARY

The present disclosure relates to active protection mechanisms for portable electronic devices. A portable electronic device includes one or more bumpers that are operable to transition between a stowed position and a deployed position. In the deployed position, the bumpers may be proud of one or more surfaces of the portable electronic device that the bumpers are not proud of in the stowed position. The bumpers may protect the surfaces from impact when proud of those surfaces if the portable electronic device contacts a surface, such as when the portable electronic device is dropped. The bumpers may form portions of side corners or other portions of the portable electronic device in the stowed position. In transitioning from the stowed position to the deployed position, the bumpers may rotate and/or translate.

In various embodiments, a portable electronic device includes a first surface; a second surface opposite the first surface; a side surface positioned between the first surface and the second surface; a bumper, coupled to the side surface, operable to transition between a stowed position where the first surface is proud of the bumper, and a deployed position where a portion of the bumper is proud of the first surface; and an activator mechanism assembly operable to rotate the bumper and translate the bumper away from the side surface while transitioning the bumper from the stowed position to the deployed position.

In some examples, the activator mechanism assembly is operable to rotate the bumper more than 45 degrees about an axis parallel to the first surface. In these examples, an additional portion of the bumper may be proud of the second surface in the deployed position. In other examples, the activator mechanism assembly is operable to rotate the bumper more than 90 degrees about an axis transverse to the first surface. In these examples, the second surface may be proud of the bumper in the stowed position and the deployed position.

In numerous examples, the activator mechanism assembly includes a restraining mechanism and a torsion spring operable to move the bumper when the restraining mechanism releases the torsion spring. In these examples, the activator mechanism assembly may further include a cam coupled to the bumper and a cam follower wherein the cam is operable to move along the cam follower to translate the bumper when the bumper is rotated. In some implementations of these examples, the restraining mechanism may include a first magnet coupled to the torsion spring, an electronically controllable electromagnetic coil and a second magnet coupled to the electronically controllable electromagnetic coil wherein the electronically controllable electromagnetic coil is operable to alter magnetic force between the first magnet and the second magnet in order to release the torsion spring. In other implementations of these examples, the restraining mechanism may include a catch component coupled to the torsion spring and a detent that is biased to engage the catch component wherein the torsion spring is released when the detent disengages from the catch component.

In some embodiments, a portable electronic device includes a surface, a flexible protector that forms a part of the surface and is operable to transition between a first state where the flexible protector is flush with the surface or recessed in the surface and a second state where at least a portion of the flexible protector projects above the surface, and an activator mechanism assembly operable to transition the flexible protector between the first and second states.

In various examples, the portable electronic device further includes a bumper. In such examples, the flexible protector is a membrane covering the bumper and the bumper is operable by the activator mechanism assembly to project the portion of the flexible protector above the surface.

In numerous examples, the activator mechanism assembly includes a moving component operable to slide along a ramp, thereby transitioning the flexible protector between the first and second states; a magnet; and an electronically controllable electromagnetic coil. In these examples, the moving component slides along the ramp in response to a change in magnetic force between the magnet and the electronically controllable electromagnetic coil. In other examples, the activator mechanism assembly includes a pump and an electrically-operated cylinder coupled to the flexible protector via a piston. In these other examples, the flexible protector transitions from the first state to the second state when the pump causes the electrically-operated cylinder to extend the piston and from the second state to the first state when the electrically-operated cylinder retracts the piston.

In various examples, the surface includes a cover glass, and the flexible protector is positioned within an area defined by the cover glass. In other examples, the surface includes a cover glass, and the flexible protector is positioned outside the cover glass.

In numerous embodiments, a portable electronic device includes a vulnerable surface, a surface adjacent the vulnerable surface, a protector operable to rotate on the surface between a retracted position where the vulnerable surface is proud of the protector and an extended position where at least part of the protector is proud of the vulnerable surface, and an activator operable to rotate the protector between the retracted position and the extended position.

In various examples, the protector forms a portion of the surface in the retracted position. In some examples, the protector forms a corner of the portable electronic device in the retracted position. In various examples, the protector includes metal.

In numerous examples, the activator includes a magnet and an electronically controllable electromagnetic coil. The electronically controllable electromagnetic coil is operable to alternate polarity to rotate the protector.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
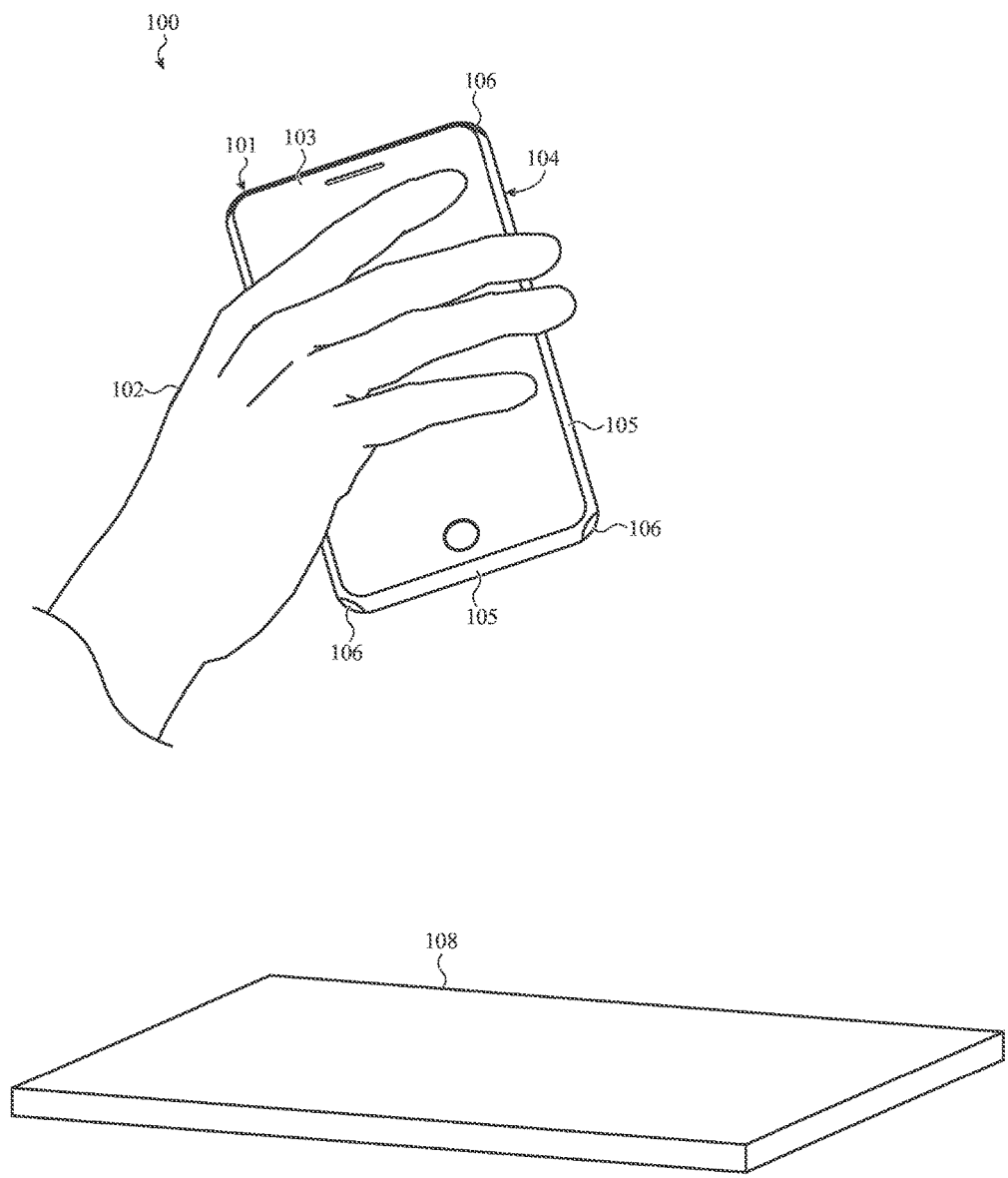
FIG. 1A depicts an environment in which a user is holding a first example of a portable electronic device above a structure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample apparatuses, systems, and methods that embody various elements of the present disclosure. However, it should be understood that the described disclosure may be practiced in a variety of forms in addition to those described herein.

The following disclosure relates to active protection mechanisms for portable electronic devices. A portable electronic device uses an activator mechanism assembly to deploy bumpers upon detection of a drop event, free fall, or impact. Typically, the bumpers are proud of one or more surfaces of the electronic device when deployed (e.g., activated), but not when stowed (e.g., unactivated). Thus, the bumpers may protect one or more surfaces of the portable electronic device by preventing the surface from impact. Further, by preventing or cushioning impact, the bumpers may protect internal components of the portable electronic device. For example, the bumpers may prevent internal components from moving and/or jostling. This may prevent internal components from moving and damaging other components, preventing connectors from disconnecting, preventing attachment mechanisms from detaching, and so on. The bumpers may form sides, corners, or portions of other surfaces of the portable electronic device in the stowed position. When moving from the stowed position to the deployed position, the bumpers may rotate and/or translate. In some implementations, the bumpers may be covered or underlaid by a membrane that blocks passage of contaminants from an external environment.

In various embodiments, the activator mechanism assembly includes a torsion spring operable to rotate the bumpers when they are not restrained by a restraining mechanism. In some examples of such embodiments, the restraining mechanism may include magnets and an electronically controllable electromagnetic coil operable to alter magnetic force between the magnets, thereby releasing the torsion spring. In other examples of such embodiments, the restraining mechanism may include a catch component having a notch and a detent. The torsion spring is released when the detent disengages from the notch. In other embodiments, an electronically controllable electromagnetic coil may interact with magnets to rotate the bumpers, rather than the torsion spring.

In numerous embodiments, the activator mechanism assembly includes a cam coupled to the bumper. The cam may slide along a cam follower to translate the bumper when the bumper is rotated.

In some embodiments, the activator mechanism assembly includes a moving component operable to slide along a ramp coupled to a bumper, to transition the bumper between the stowed position and the deployed position. The moving component may slide along the ramp due to magnetic force between a magnet and an electronically controllable electromagnetic coil. In other embodiments, the activator mechanism assembly may include a pneumatic, hydraulic, or other type of cylinder operable to extend and/or retract a piston as air, liquid, or other material is pumped in and/or out of the cylinder. Movement of the piston may transition the bumper between the stowed position and the deployed position. In still other embodiments, a solenoid may transition the bumper between the stowed position and the deployed position.

These and other embodiments are discussed below with reference to FIGS. 1-15. However, those skilled in the art will readily appreciate that the detailed description given herein with respect to these Figures is for explanatory purposes only and should not be construed as limiting.

FIG. 1A depicts an environment 100 in which a user 102 is holding a first example of a portable electronic device 101 above a structure 108. The portable electronic device 101 includes a first surface 103 (e.g., a first vulnerable surface, shown as a touch display screen), a second surface 104 (e.g., a second vulnerable surface, shown as a back surface adjacent to which one or more batteries may be positioned inside the portable electronic device 101) opposite the first surface 103, and side surfaces 105 positioned between and adjacent to the first and second surfaces 103, 104. The portable electronic device 101 also includes one or more bumpers 106 or protectors. The first, second, and/or side surfaces 103, 104, 105 may be vulnerable to damage from impacting an object, such as when a drop event or free fall causes the portable electronic device 101 to impact an object such as the structure 108. The bumpers 106 may protect one or more of the first, second, and/or side surfaces 103, 104, 105 from such an impact. Protecting the first, second, and/or side surfaces 103, 104, 105 from impact may also protect internal components from consequences of the impact.

The bumpers 106 are shown in a stowed position (e.g., retracted position) in FIG. 1A. In this example, the bumpers 106 are flush with the side surfaces 105 and not proud of either the first surface 103 or the second surface 104. When stowed, the bumpers 106 are contiguous with the side surfaces 105 and may function as the corners of the portable electronic device 101.

Figure 1B:
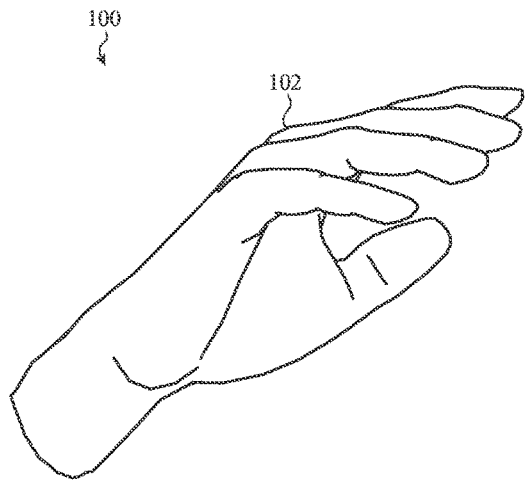
FIG. 1B depicts the environment of FIG. 1A after the user drops the first example portable electronic device and the bumpers transition to a deployed position to protect the surfaces of the portable electronic device from impacting the structure.
Figure 1B:
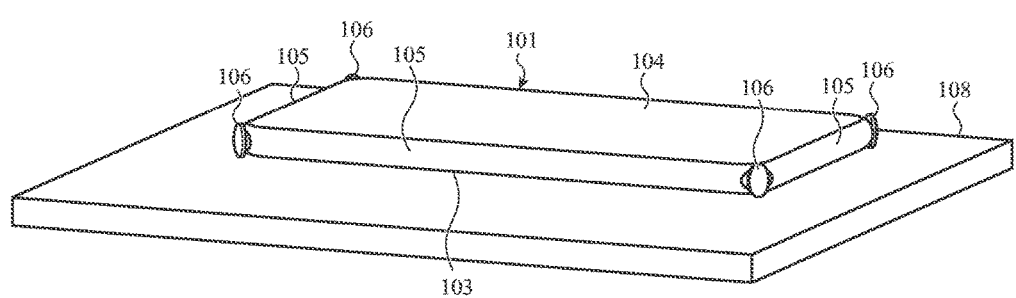

FIG. 1B depicts the environment 100 of FIG. 1A after the user 102 drops the first example portable electronic device 101. The bumpers 106 were transitioned to a deployed position (e.g., extended position) in order to protect surfaces of the portable electronic device 101 from impacting the structure 108. In this example, portions of the bumpers 106 may be proud of the first and/or second surface 103, 104. Such proud portions may prevent the first and/or second surface 103, 104 from impacting the structure 108 and/or absorb at least a portion of the energy of the impact.

With reference to FIGS. 1A and 1B, the bumpers 106 may rotate (e.g., rotate on the side surfaces 105) to transition between the stowed and deployed positions. The bumpers may also translate in a direction away from the side surfaces 105 of the portable electronic device 101 while transitioning between the stowed and deployed positions.

The portable electronic device 101 may use one or more activator mechanism assemblies to transition the bumpers 106 from the stowed position to the deployed position, for example upon detection of a free fall or drop event. The portable electronic device 101 may detect a free fall or drop event by periodically, continuously, intermittently, or otherwise monitoring one or more sensors. Sample sensors are one or more of accelerometers, inertial sensors, cameras, magnetometers, position tracking systems (such as a global positioning system), and so on. The portable electronic device 101 may also use the one or more various activator mechanism assemblies to transition the bumpers 106 from the stowed position to the deployed position upon detection of an impact related to such a free fall or drop event, to prevent damage to a vulnerable surface, such as a cover glass of a display, caused by a secondary impact (e.g., a second part of the portable electronic device 101 striking the structure 108 due to a first part of the portable electronic device 101 striking the structure 108 and reorienting the portable electronic device 101 to cause the secondary impact). This may prevent damage to vulnerable surfaces.

Figure 1C:
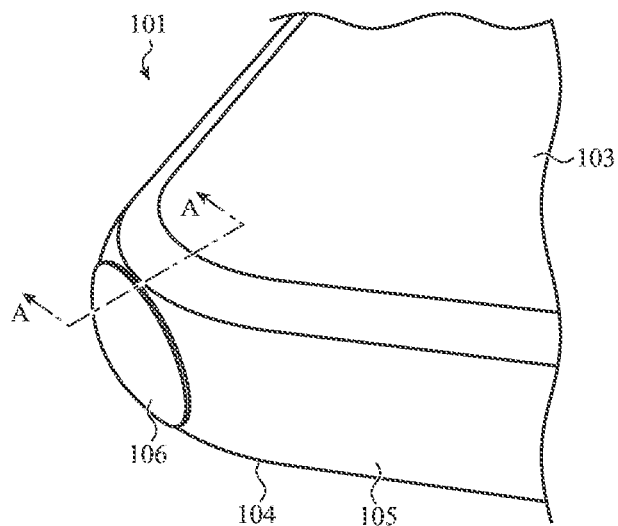
FIG. 1C depicts a partial close-up view of the portable electronic device showing one of the bumpers in a stowed position.

FIG. 1C depicts a partial close-up view of the portable electronic device 101, showing one of the bumpers 106 in a stowed position. In this example, both the first surface 103 and the second surface 104 are proud of (or flush with) the bumper 106. The side surfaces 105 and the bumper 106 may form a contiguous surface, the bumper 106 being flush with the side surfaces 105, where the bumper 106 functions as the corner between side surfaces 105.

Figure 1D:
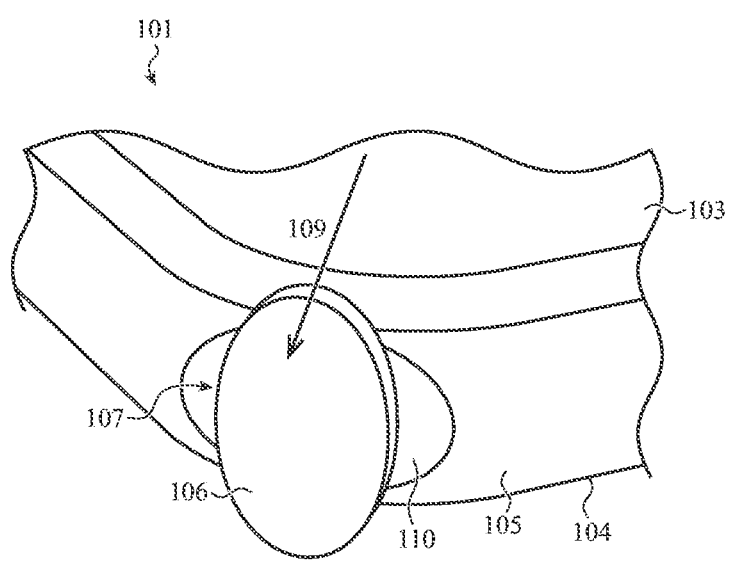
FIG. 1D depicts the portable electronic device of FIG. 1C when the bumper transitions to a deployed position.

FIG. 1D depicts the portable electronic device 101 of FIG. 1C when the bumper 106 transitions to a deployed position. The bumper 106 includes a shaft 107 that rotates approximately 90 degrees (though other amounts of rotation are possible, such as 30 degrees, more than 45 degrees, 75 degrees, 110 degrees, and so on) and translates in a direction 109 away from the side surfaces 105. This causes the bumper 106 to move out of a recess 110 in the side surfaces 105 and the first portion of the bumper 106 to be proud of the first surface 103, while the additional portion of the bumper 106 is proud of the second surface 104.

Figure 1E:
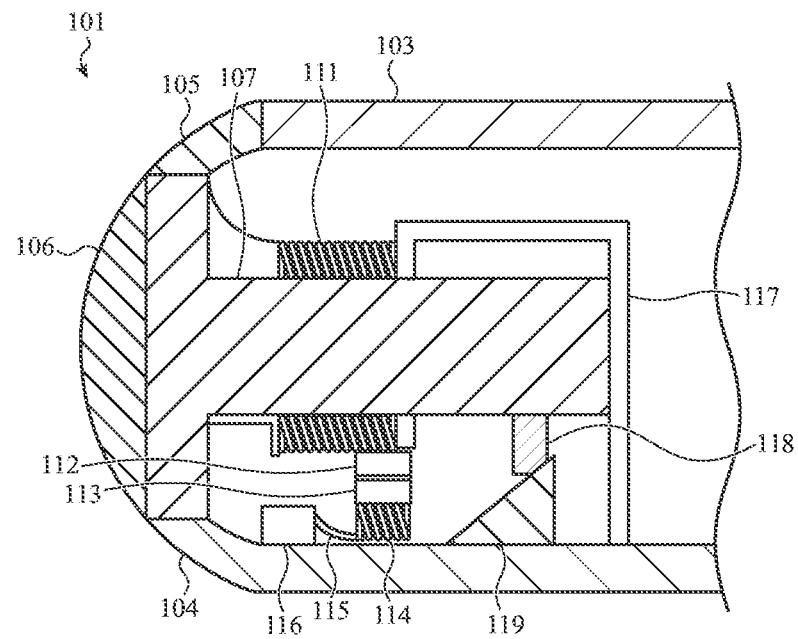
FIG. 1E depicts a first example cross-sectional view of an electronic device, taken along line A-A of FIG. 1C, depicting a first example activator mechanism assembly in accordance with various embodiments.

FIG. 1E depicts a first example cross-sectional view of an electronic device 101, taken along line A-A of FIG. 1C, depicting a first example activator mechanism assembly in accordance with various embodiments. In this example, the activator mechanism assembly may include a torsion spring 111, a restraining mechanism (shown as including a first magnet 112, a second magnet 113, and an electromagnetic coil 114), a rotational mount 117, a cam 118, and a cam follower 119. The shaft 107 may be mounted to the rotational mount 117 such that the shaft 107 is operable to rotate and translate. The torsion spring 111 may be biased to rotate the shaft 107, when the torsion spring 111 is not restrained by the restraining mechanism.

When the restraining mechanism releases the torsion spring 111, the torsion spring 111 may rotate the shaft 107 (and thus the bumper 106) from the stowed position to the deployed position. The shaft 107 and bumper 106 may rotate about an axis parallel to the first surface 103 (e.g., along line 109 of FIG. 1D). This rotation also causes the cam 118 to slide along the cam follower 119, translating the shaft 107 such that the bumper 106 translates away from the side surface 105.

Figure 1F:
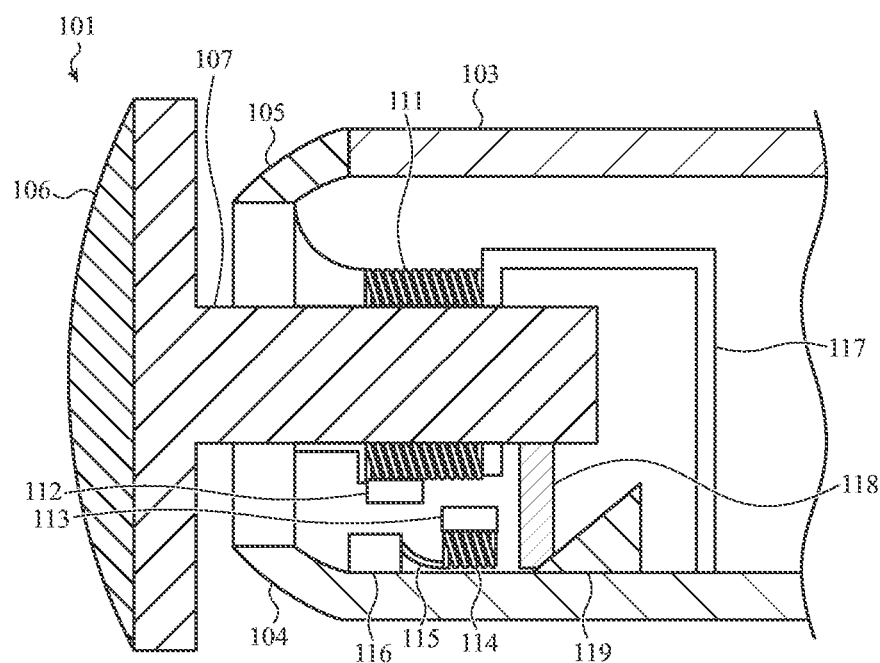
FIG. 1F depicts the first example portable electronic device of FIG. 1E after the first example activator mechanism assembly rotates and translates the bumper away from the side surface.
Figure 1G:
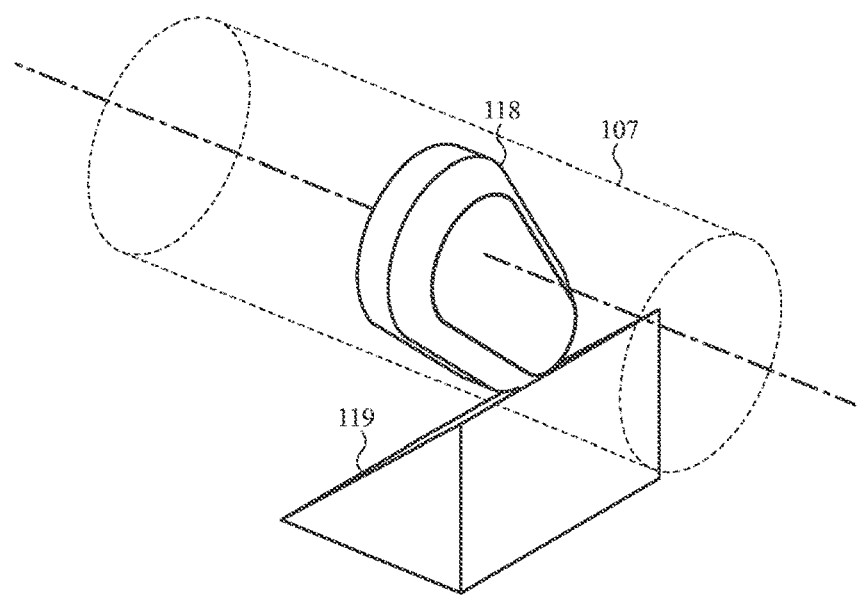
FIG. 1G depicts another view of the shaft, the cam, and the cam follower in isolation with the shaft shown in outline for clarity.
Figure 1H:
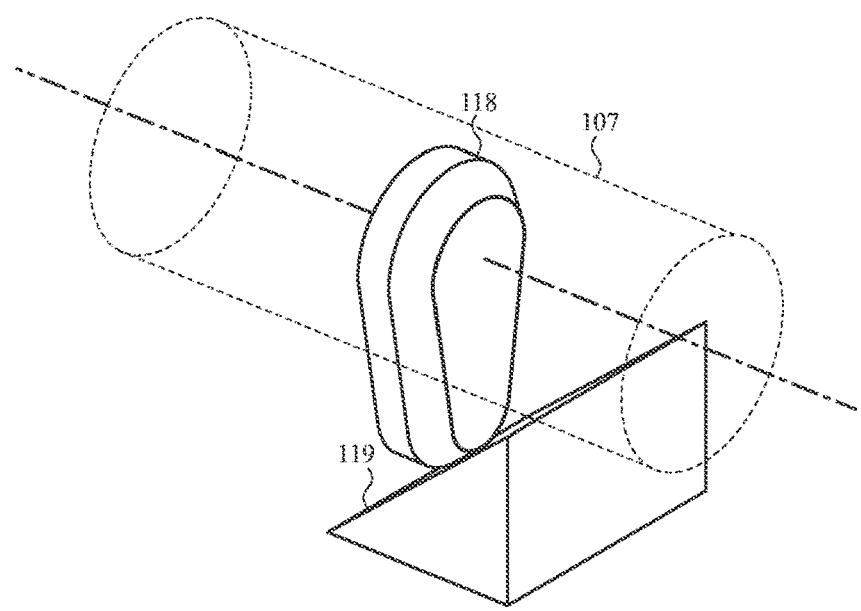
FIG. 1H depicts the view of FIG. 1G after rotation of the shaft and the cam.

FIGS. 1G and 1H are additional views of the shaft 107, the cam 118, and the cam follower 119 in isolation with the shaft shown in outline for clarity. FIGS. 1G and 1H illustrate how the shape of the cam 118 forces the cam 118 to slide along the cam follower 119 during rotation. FIG. 1G shows the cam 118 and the cam follower 119 positioned when the shaft is retracted as shown in FIG. 1E. As the shaft 107 rotates to the translated position shown in FIG. 1F, the cam 118 rotates along with the shaft 107. This rotation causes more of the shape of the cam 118 to be positioned between the shaft 107 and the cam follower 119. Due to the fixed distance between the shaft 107 and the cam follower 119, positioning more of the shape of the cam 118 between the shaft 107 and the cam follower 119 forces the cam 118 to slide down the ramp formed by the cam follower 119, as shown in FIG. 1H. This translates the shaft 107 in the direction shown in FIG. 1F.

As described above, the restraining mechanism includes a first magnet 112, a second magnet 113, and an electromagnetic coil 114. The first magnet 112 is coupled to the torsion spring 111 and is operable to rotate with the shaft 107. Magnetic force between the first magnet 112 and the second magnet 113 restrains the torsion spring 111. The electromagnetic coil 114 may be electronically controllable by a controller 116 (such as a processing unit) coupled to the electromagnetic coil 114 by a flex 115 and/or other electrical connection. The controller 116 may electronically control the electromagnetic coil 114 to alter magnetic force between the first magnet 112 and the second magnet 113, restraining and/or releasing the torsion spring 111.

For example, the first magnet 112 may magnetically attract the second magnet 113, thereby restraining the torsion spring 111. The electromagnetic coil 114 may alter the magnetic field such that the first and second magnets 112, 113 repel or no longer attract, thereby releasing the torsion spring 111. By way of another example, the first and second magnets 112, 113 may repel (or not attract one another) except when the electromagnetic coil 114 alters the magnetic force. In such an example, current flow through the electromagnetic coil 114 may cease, or reverse, thus releasing the torsion spring 111.

FIG. 1F depicts the first example portable electronic device 101 of FIG. 1E after the first example activator mechanism assembly rotates and translates the bumper 106 away from the side surface 105. Thus, the bumper 106 transitions from the stowed position to the deployed position.

Although FIGS. 1A-1F show the bumper 106 emerging from the recess 110 and translating away from the side surface 105, it is understood that this is an example. In various implementations, the portion of the side surface 105 forming the recess 110 may translate along with the bumper 106. This allows the bumper 106 to translate while preventing dirt or other contaminants from getting lodged in the recess 110.

Figure 1I:
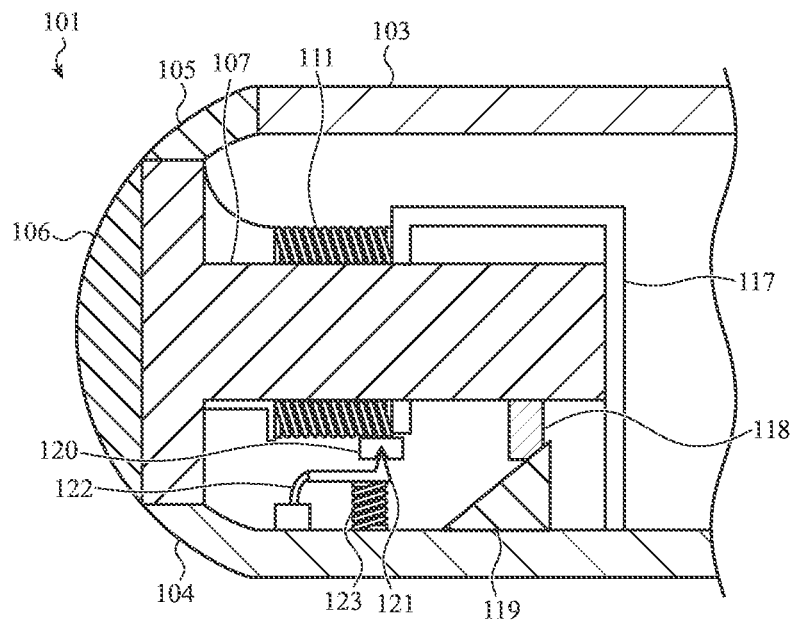
FIG. 1I depicts a second example cross-sectional view an electronic device, taken along line A-A of FIG. 1C, depicting a second example activator mechanism assembly in accordance with further embodiments.

FIG. 1I depicts a second example cross-sectional view of the portable electronic device 101, taken along line A-A of FIG. 1C, depicting a second example activator mechanism assembly. In this second example, the activator mechanism assembly includes a torsion spring 111 that is operable to rotate the shaft 107, a catch component 120 that defines a notch coupled to the torsion spring 111, and a detent 121 that includes a pivot mount 122 and a spring 123.

The detent 121 may rotate with or about the pivot mount 122 and be spring biased by the spring 123 to engage the notch of the catch component 120, thereby restraining the torsion spring 111. However, the detent 121 may rotate with or about the pivot mount 122 against the biasing force of the spring 123 to disengage from the notch. For example, force from a primary impact to the portable electronic device 101 may compress the spring 123 such that the detent 121 disengages from the catch component 120. This may release the torsion spring 111 and allow it to rotate, thereby deploying the bumper 106 to protect part of the portable electronic device 101 against a secondary impact.

As such, this second example activator mechanism assembly may operate mechanically without sensors or electronic controllers. Detection of a free fall, drop event, or impact based on sensor data may thus be omitted.

Figure 1J:
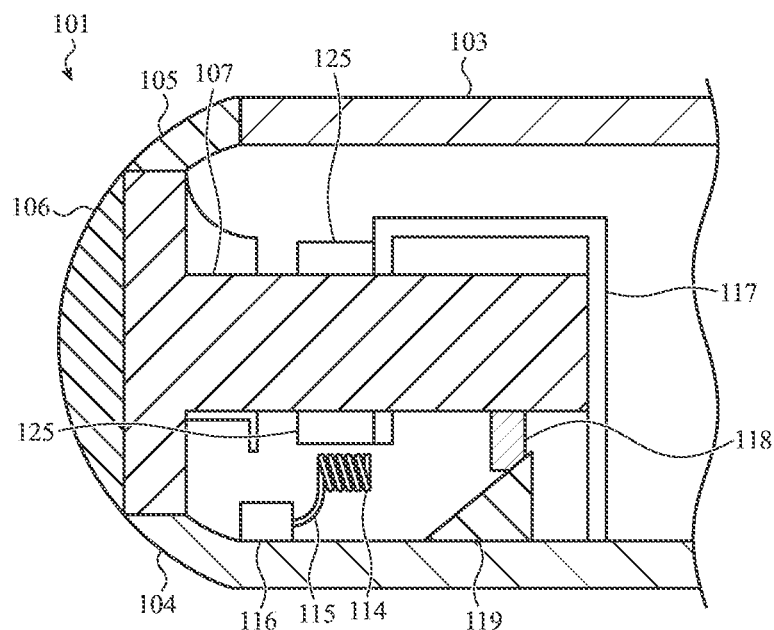
FIG. 1J depicts a third example of a cross-sectional view of an electronic device, taken along line A-A of FIG. 1C, depicting a third example activator mechanism assembly in accordance with further embodiments.

FIG. 1J depicts a third example of a cross-sectional view of the portable electronic device 101, taken along line A-A of FIG. 1C. In this third example, the activator mechanism assembly includes one or more magnets 125 mounted to the shaft 107. An electromagnetic coil 114 is controlled by the controller 116. The controller 116 may alternate a polarity and/or strength of a magnetic field of the electromagnetic coil 114, for example, by varying a current through the electromagnetic coil 114. The alternating polarity and/or strength of the magnetic field may attract and/or repel the magnets 125. Dynamically changing the magnetic force and/or polarity of the electromagnetic coil 114 may cause the magnets 125 to rotate the shaft 107 because the magnets 125 are coupled to the shaft 107. This rotation may deploy the shaft 107 and bumper 106 and/or cause the shaft 107 to extend, such as via the cam 118 and cam follower 119 discussed above.

As illustrated and described above, the activator mechanism assemblies of FIGS. 1E, 1F, 1I, and 1J may transition the bumpers 106 from the stowed position to the deployed position. In some implementations, such activator mechanism assemblies may not also be operable to transition the bumpers 106 from the deployed position to the stowed position. Instead, the user 102 may manually translate and rotate the bumpers 106 to transition the bumpers 106 from the deployed position to the stowed position.

However, in various implementations, such activator mechanism assemblies also may transition the bumpers 106 from the deployed position to the stowed position. For example, the activator mechanism assembly of FIG. 1J may alternate the polarity of the magnetic field of the electromagnetic coil 114 so as to rotate the magnets 125 and the associated shaft 107 in an opposite direction to that used to deploy the bumper 106, transitioning the bumper 106 from the deployed position to the stowed position. Various configurations are possible and contemplated.

In various examples, the bumpers 106 may be formed from a hard material such as steel or another metal. Forming the bumpers 106 from a hard material may allow the bumpers 106 to absorb more of the energy of an impact than if the bumpers 106 were formed from a soft material such as rubber, a polymer, and so on. Further, forming the bumpers 106 from a hard material may prevent the bumpers 106 from deforming due to impact. Accordingly, the first or second surfaces 103, 104 may still contact a structure 108 even if dropped repeatedly, rather than deforming due to exposed vulnerable areas. Additionally, bumpers 106 formed from a hard material rather than a soft material may be more durable and may not themselves be damaged by impacts.

Figure 2A:
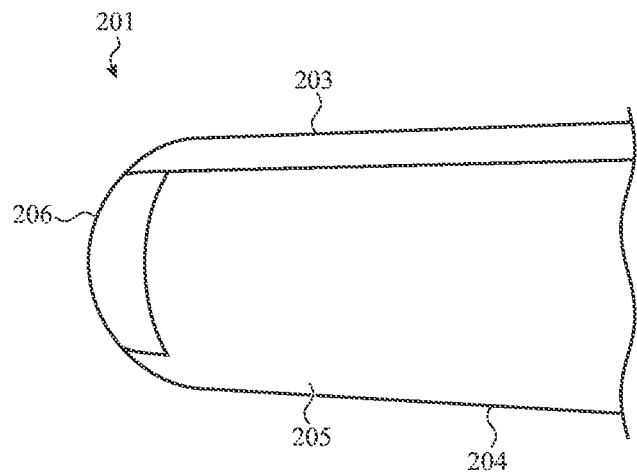
FIG. 2A depicts a side view of a second example portable electronic device showing a bumper in a stowed position.
Figure 2B:
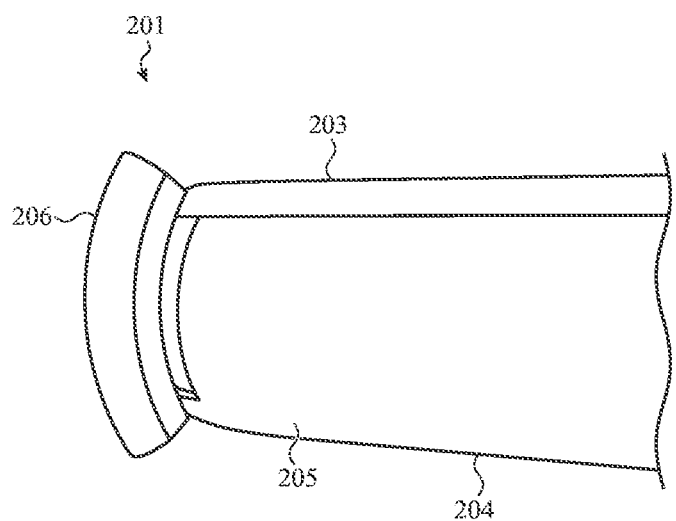
FIG. 2B depicts the second example portable electronic device of FIG. 2A with the bumper in the deployed position.

FIG. 2A depicts a side view of a second example portable electronic device 201, showing a bumper 206 or protector in a stowed position (e.g., retracted position). FIG. 2B depicts the portable electronic device 201 of FIG. 2A with the bumper 206 in the deployed position (e.g., extended position). Similar to the portable electronic device 101 of FIGS. 1A-1B, the first and second surfaces 203 and 204 (e.g., first and second vulnerable surfaces) are proud of the bumper 206 and the side surfaces 205 are flush with the bumper 206 when the bumper 206 is stowed. By contrast, a first portion of the bumper 206 is proud of the first surface 203 and an additional portion of the bumper 206 is proud of the second surface 204 when deployed. Contrasted with the first example portable electronic device 101 of FIGS. 1A-1B, the bumper 206 may rotate (e.g., rotate on the side surface 205) approximately 90 degrees without translating when transitioning from the stowed position to the deployed position.

Figure 2C:
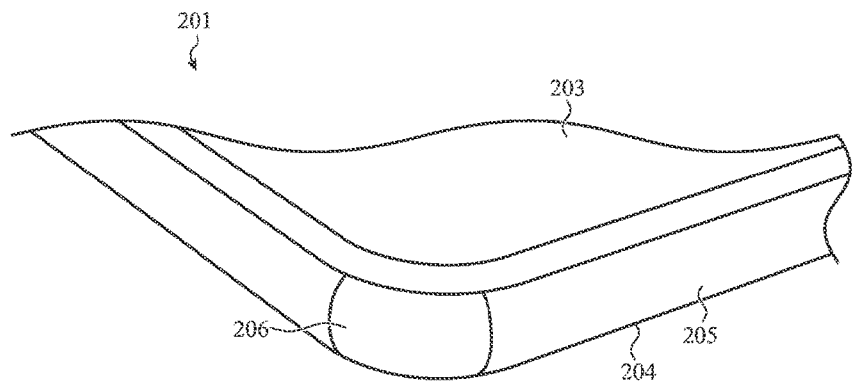
FIG. 2C depicts a partial view of the second example portable electronic device of FIG. 2A with the bumper in the stowed position.
Figure 2D:
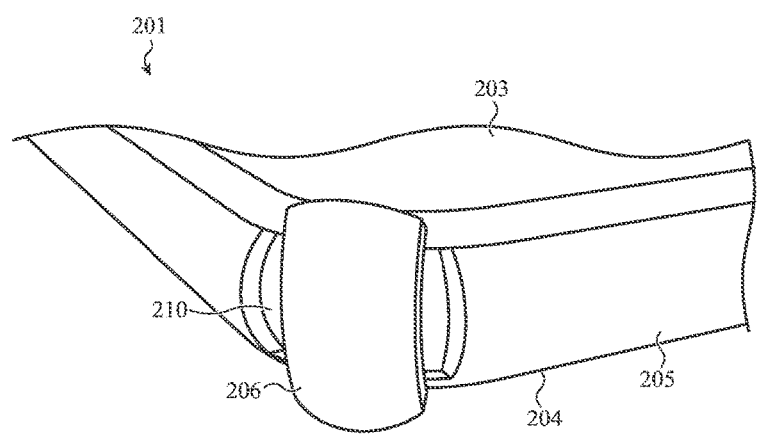
FIG. 2D depicts a partial view of the second example portable electronic device of FIG. 2C with the bumper in the deployed position.

FIG. 2C depicts another view of the portable electronic device 201 of FIG. 2A with the bumper 206 stowed and FIG. 2D depicts another view of the portable electronic device 201 of FIG. 2C with the bumper 206 deployed. Contrasted with the first example portable electronic device 101 of FIGS. 1A-1B, edges of the bumper 206 may be curved or "dished." This dished shape may cause more surface area of (and/or additional portions of) the bumper 206 to contact an object upon impact as compared to the bumper 106 of FIGS. 1A-1B. The greater surface area of the bumper 206 may absorb more impact energy, as compared to other possible discussed configurations. Further, the dished shape of the first and/or additional portions of the bumper 206 may reduce the possibility that the impact will damage the first and/or additional portions of the bumper 206 than the more pointed shape of the first and additional portions of the bumper 106.

Figure 3A:
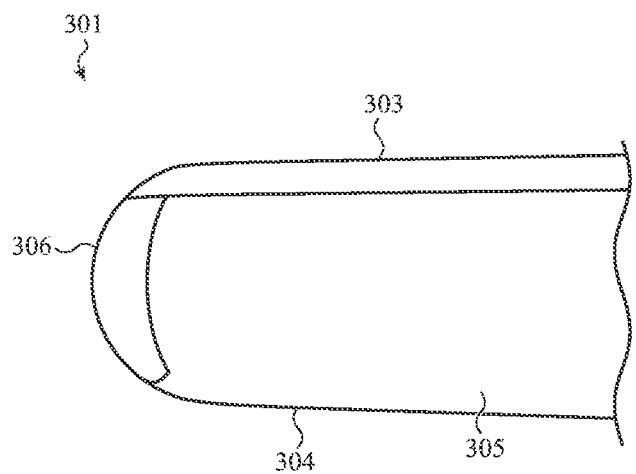
FIG. 3A depicts a partial side view of a third example portable electronic device showing a bumper in a stowed position.
Figure 3B:
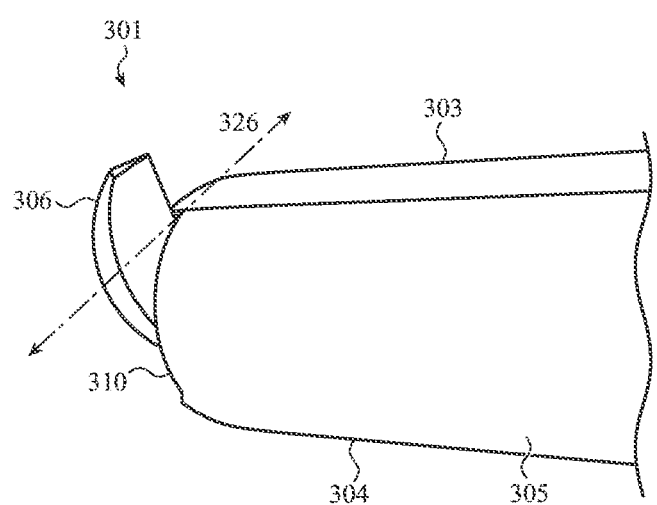
FIG. 3B depicts a partial side view of the third example portable electronic device of FIG. 3A with the bumper in the deployed position.

FIG. 3A depicts a partial side view of a third example portable electronic device 301 showing a bumper 306 or protector in a stowed position (e.g., retracted position); FIG. 3B depicts the bumper 306 in the deployed position (e.g., extended position). Similar to the second example portable electronic device 201 of FIGS. 2A-2D, the bumper 306 is flush with the side surfaces 305 when stowed. However, the first and second surfaces 303, 304 (e.g., first and second vulnerable surfaces) override bumper edges when the bumper 306 is stowed. A portion of the bumper 306 nonetheless is proud of the first surface 303 when deployed. In this embodiment, the bumper 306 rotates (e.g., rotates on the side surfaces 105) more than 90 degrees (shown as approximately 180 degrees) about an axis 326 that is transverse to the first surface 303, when the bumper 306 transitions from the stowed position to the deployed position.

Figure 4A:
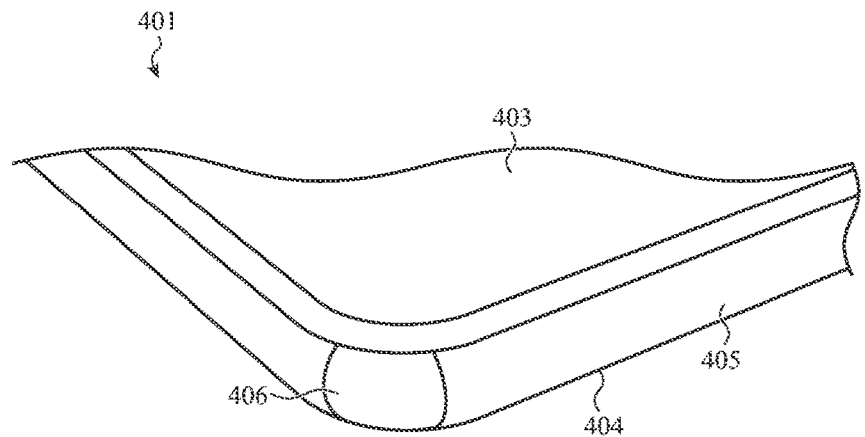
FIG. 4A depicts a partial view of a fourth example portable electronic device showing a bumper in a stowed position.
Figure 4B:
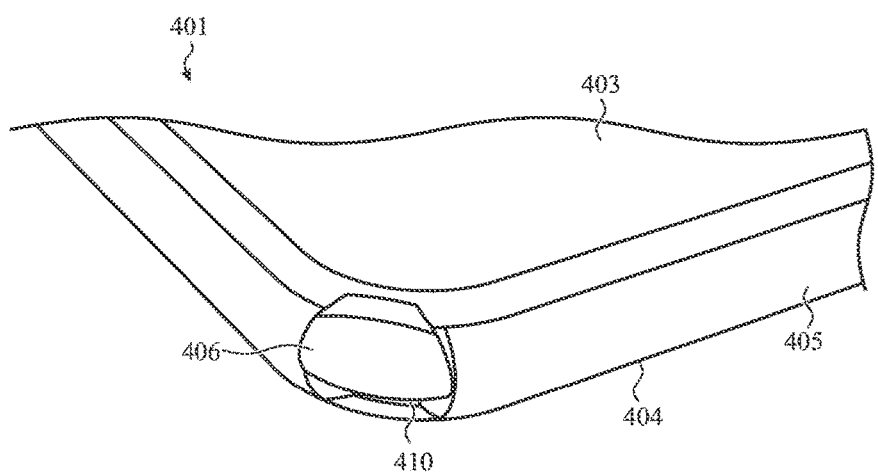
FIG. 4B depicts a partial view of the fourth example portable electronic device of FIG. 4A with the bumper in the deployed position.

FIG. 4A depicts a partial view of a fourth example portable electronic device 401 showing a bumper 406 or protector in a stowed position. FIG. 4B depicts the portable electronic device 401 with the bumper 406 deployed. In this embodiment, the bumper 406 forms the entirety of the corner of the portable electronic device 401. Similar to the third example portable electronic device 301 of FIGS. 3A-3B, the first and second surfaces 403 and 404 (e.g., first and second vulnerable surfaces) are proud of the bumper 406 and the side surfaces 405 are flush with the bumper 406 in the stowed position, whereas a portion of the bumper 406 is proud of the first surface 403 in the deployed position. Contrasted with the third example portable electronic device 301 of FIGS. 3A-3B, the portion of the bumper 406 proud of the first surface 403 in the deployed position is dish shaped, as opposed to the more pointed shape of the bumper 306. The recess 410 is correspondingly dished, so that the bumper 406 is flush with the side surfaces 405. Thus the bumper 406 is contiguous with the side surfaces 405 when stowed.

Figure 5A:
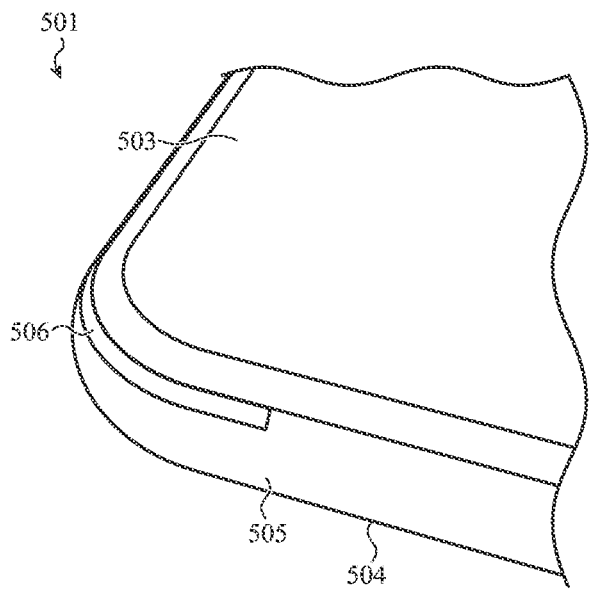
FIG. 5A depicts a partial view of a fifth example portable electronic device showing a bumper in a stowed position.
Figure 5B:
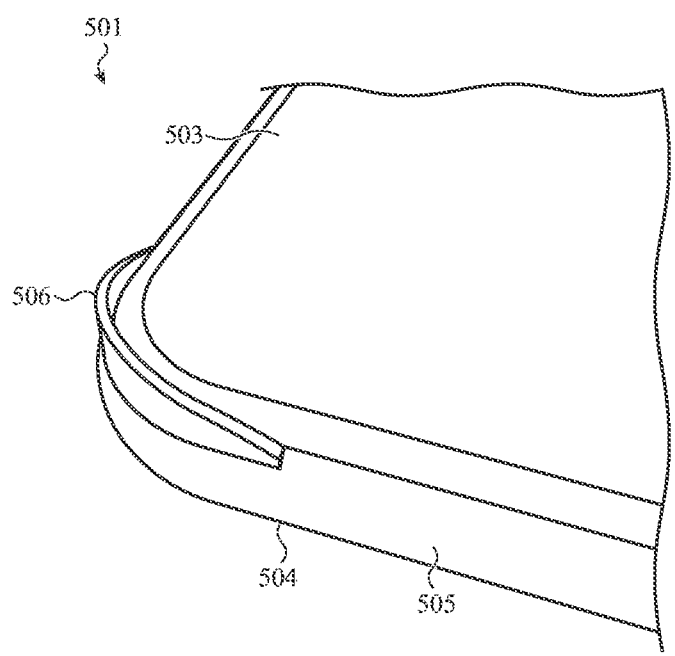
FIG. 5B depicts a partial view of the fifth example portable electronic device of FIG. 5A with the bumper in the deployed position.

FIG. 5A depicts a partial view of a fifth example portable electronic device 501, showing a bumper 506 or protector in a stowed position. FIG. 5B depicts the portable electronic device 501 of FIG. 5A with the bumper 506 in the deployed position. Similar to the third example portable electronic device 301 of FIGS. 3A-3B, the first and second surfaces 503 and 504 are proud of the bumper 506 when it is in the stowed position, whereas a portion of the bumper 506 is proud of the first surface 503 when deployed. Here, the bumper 506 is a scallop shaped component that rotates to retract into the portable electronic device 501 when stowed and project out of the portable electronic device 501 when deployed. Deployed, the bumper 506 extends further in the middle, sloping downward on the sides. Thus, the middle is proud of the first surface 503 while the ends are not. The bumper 506 may extend out at an angle, rotate, and so on. Thus, the bumper 506 is an impact surface that forms part of the housing of the portable electronic device 501.

The portable electronic devices 201-501 of FIGS. 2A-5B may include various activator mechanism assemblies operable to transition the respective bumpers 206-506 between the stowed and deployed positions. Such activator mechanism assemblies may include the activator mechanism assemblies of FIGS. 1E, 1F, 1I, 1J, and so on.

Figure 6A:
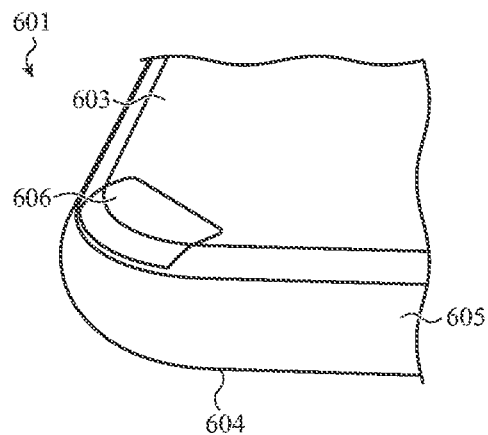
FIG. 6A depicts a partial view of a sixth example portable electronic device showing a bumper in a stowed position.

FIG. 6A depicts a partial view of a sixth example portable electronic device 601 showing a bumper 606 or protector in a stowed position. Similar to the portable electronic device 501 of FIGS. 5A-5B, the bumper 606 is not proud of the first surface 603 or the second surface 604 in the stowed position. As contrasted with the portable electronic device 501 of FIGS. 5A-5B, the bumper 606 forms a portion of the first surface 603 rather than one or more side surfaces 605. The bumper 606 may be flush with the first surface 603 in the stowed position, recessed below the first surface 603 in the stowed position, and so on.

Figure 6B:
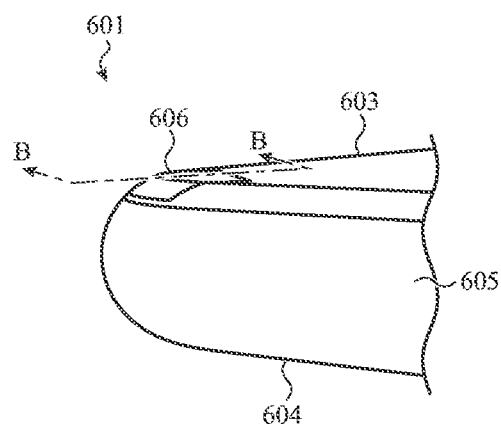
FIG. 6B depicts a partial side view of the sixth example portable electronic device with the bumper in the stowed position.
Figure 6C:
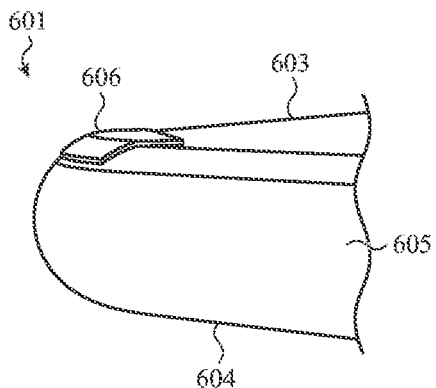
FIG. 6C depicts a partial side view of the sixth example portable electronic device of FIG. 6B with the bumper in the deployed position.

FIG. 6B depicts a partial side view of the sixth example portable electronic device 601 with the bumper 606 in the stowed position. FIG. 6C depicts a partial side view of the sixth example portable electronic device 601 of FIG. 6B with the bumper 606 in the deployed position. Similar to the portable electronic device 501 of FIGS. 5A-5B, the bumper 606 is proud of the first surface 603 but not the second surface 604 in the stowed position. As contrasted with the portable electronic device 501 of FIGS. 5A-5B, the bumper 606 may translate without rotating between the stowed and deployed positions.

As shown in FIGS. 6A-6C, the bumper 606 may form a portion of the first surface 603 and extend around a lip or edge of such a first surface 603. The first surface 603 may include a component, such as the cover glass or other element of a touch screen display. In this example, the bumper 606 is located in an area of the first surface 603 outside of the cover glass of the touch screen display.

Figure 6D:
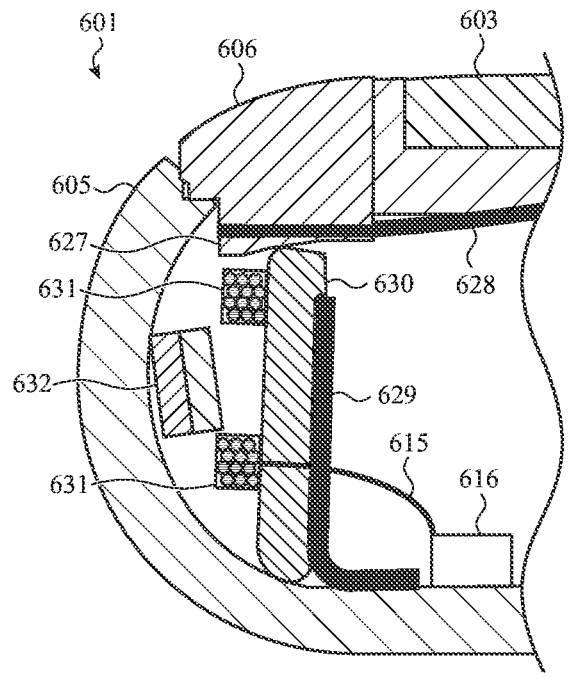
FIG. 6D depicts an example cross-sectional view of an electronic device, taken along line B-B of FIG. 6B, depicting an example activator mechanism assembly in accordance with various embodiments.

FIG. 6D depicts an example cross-sectional view of the sixth example portable electronic device 601, taken along line B-B of FIG. 6B. This figure illustrates an example activator mechanism assembly in accordance with various embodiments. In this example, the activator mechanism assembly includes a moving component 630, a magnet 632, and an electrically controllable electromagnetic coil 631.

The moving component 630 may be flexibly coupled to a housing or other structure of the portable electronic device 601 via a flexible coupler 629. The flexible coupler 629 may allow the moving component 630 to move along a ramp 627 (which may be coupled to the bumper 606 and/or the housing or other structure of the portable electronic device 601 via a coupler 628). The moving component 630 may slide along the ramp 627 as a result of magnetic force between the magnet 632 and the electrically controllable electromagnetic coil 631. Sliding the moving component 630 along the ramp 627 may exert and/or release pressure on the bumper 606, transitioning the bumper 606 between the stowed position and the deployed position, or vice versa. This moves the bumper 606 upward so that its exterior is proud of the first surface 603 and discontinuous with the side surface 605. The bumper 606 exterior shields the first surface 603 from impact by hitting first.

The electrically controllable electromagnetic coil 631 may be electronically controllable by a controller 616 coupled to the electrically controllable electromagnetic coil 631 by a flex 615 and/or other electrical connection. The controller 616 may electronically control the electrically controllable electromagnetic coil 631 to attract, not attract, and/or repel the magnet 632.

For example, the controller 616 may control the electrically controllable electromagnetic coil 631 to attract the magnet 632 in order to slide the moving component 630 along the ramp 627. This transitions the bumper 606 from the stowed position to the deployed position. Conversely, the controller 616 may control the electrically controllable electromagnetic coil 631 to not attract and/or repel the magnet 632, thereby sliding the moving component 630 in a reverse direction along the ramp 627. This transitions the bumper 606 from the deployed position to the stowed position. In some embodiments, repelling the magnet 632 may deploy the bumper 606 and attracting the magnet 632 may stow the bumper 606.

Figure 6E:
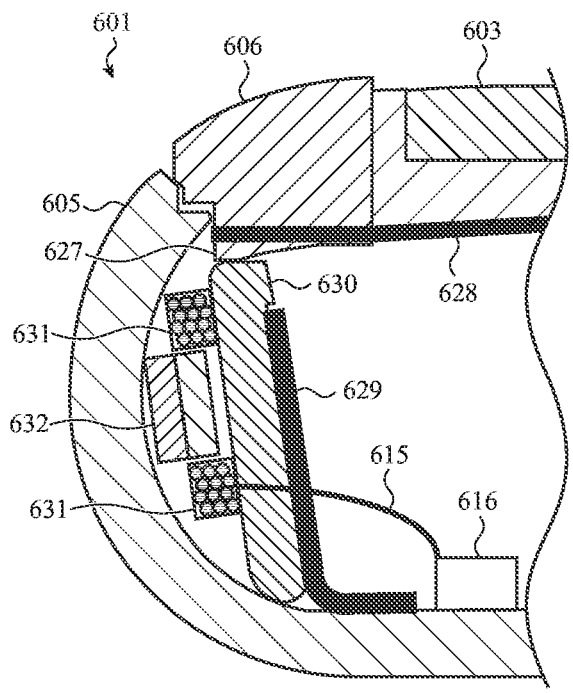
FIG. 6E depicts the sixth example portable electronic device of FIG. 6D after the example activator mechanism assembly transitions the bumper to the deployed position.

FIG. 6E depicts the sixth example portable electronic device 601 of FIG. 6D, after the example activator mechanism assembly transitions the bumper 606 to the deployed position. Due to magnetic force between the electrically controllable electromagnetic coil 631 and the magnet 632, the moving component 630 slides along the ramp 627, exerting pressure on the bumper 606 and transitioning it from the stowed position to the deployed position.

Figure 7A:
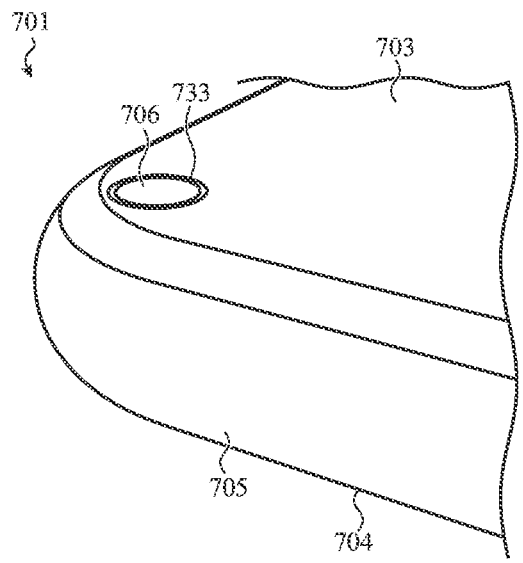
FIG. 7A depicts a partial view of a seventh example portable electronic device showing a bumper in a stowed position.
Figure 7B:
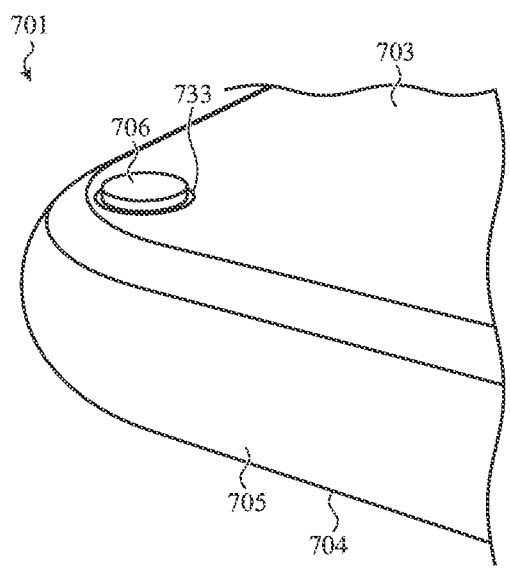
FIG. 7B depicts a partial view of the seventh example portable electronic device of FIG. 7A with the bumper in the deployed position.

FIG. 7A depicts a partial view of a seventh example portable electronic device 701 showing a bumper 706 or protector in a stowed position. FIG. 7B depicts the seventh example portable electronic device 701 of FIG. 7A with the bumper 706 deployed. Similar to the portable electronic device 601 of FIGS. 6A-6E, the bumper 706 may form a portion of the first surface 703 rather than a side surface 705 or the second surface 704. As contrasted with the portable electronic device 601 of FIGS. 6A-6E, the bumper 706 is located in an area of the first surface 703 within an area defined by the cover glass of the touch screen display. Compared to the portable electronic device 601 of FIGS. 6A-6E, this configuration may allow the cover glass to occupy all of the first surface 703 and/or a larger portion of the first surface 703 than the cover glass of the portable electronic device 601 of FIGS. 6A-6E.

As the bumper 706 and the cover glass may both be formed of relatively hard materials, contact between the bumper 706 and a cover glass may possibly damage the bumper 706 and/or the cover glass. To prevent or mitigate such potential damage, a cushioning element 733 may be positioned between the bumper 706 and the cover glass. Such a cushioning element 733 may be formed of plastic, rubber, elastomer, and/or any other material that protects the bumper 706 and/or the cover glass from contact between the two. A cushioning element 733 may be used on any embodiment discussed herein.

Figure 8A:
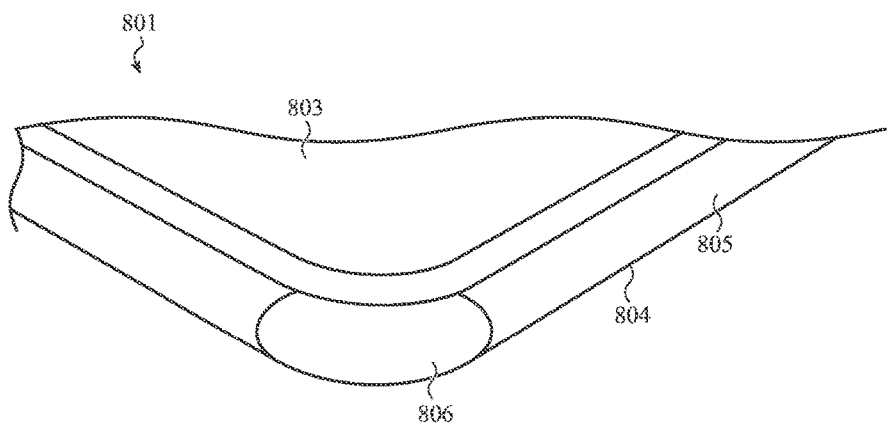
FIG. 8A depicts a partial view of an eighth example portable electronic device showing a bumper in a stowed position.
Figure 8B:
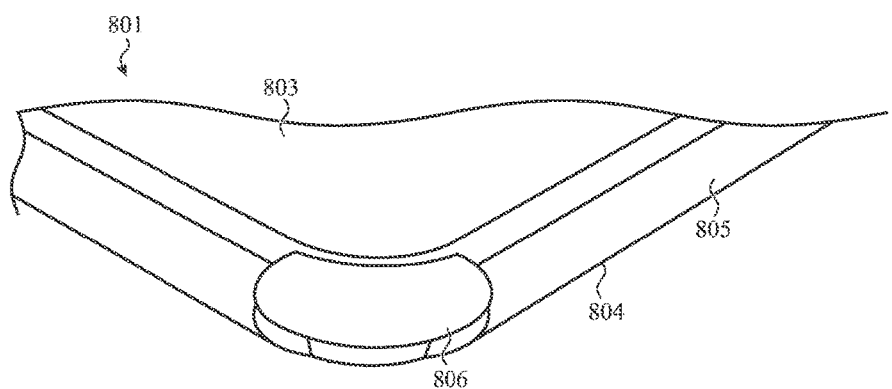
FIG. 8B depicts a partial view of the eighth example portable electronic device of FIG. 8A with the bumper in the deployed position.

FIG. 8A depicts a partial view of an eighth example portable electronic device 801 showing a bumper 806 or protector in a stowed position. FIG. 8B depicts the eighth example portable electronic device 801 of FIG. 8A with the bumper 806 in the deployed position. Similar to the portable electronic device 501 of FIGS. 5A-5B, the bumper 806 is not proud of the first surface 803 or the second surface 804 in the stowed position. As contrasted with the portable electronic device 501 of FIGS. 5A-5B, the bumper 806 translates rather than rotates to be proud of the first surface 803 in the deployed position.

Figure 8C:
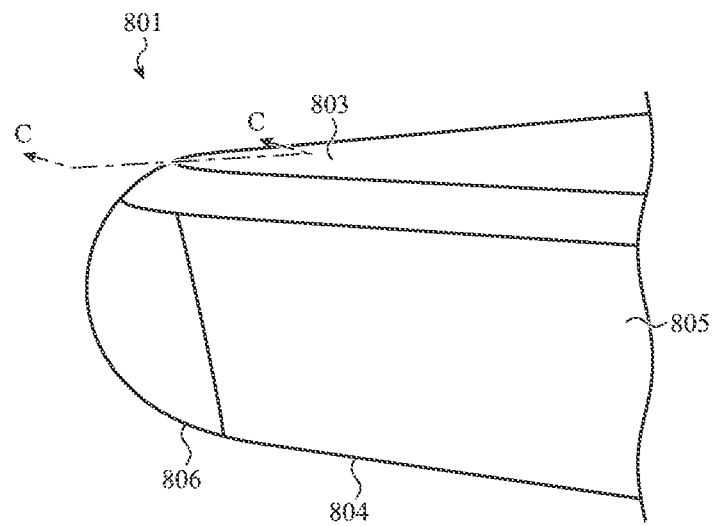
FIG. 8C depicts a partial side view of the eighth example portable electronic device of FIG. 8A with the bumper in the stowed position.
Figure 8D:
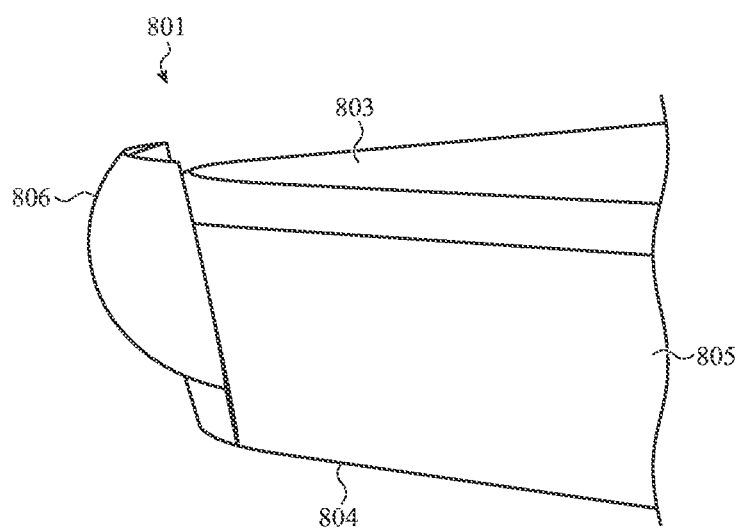
FIG. 8D depicts a partial side view of the eighth example portable electronic device of FIG. 8C with the bumper in the deployed position.

FIG. 8C depicts a partial side view of the eighth example portable electronic device 801 of FIG. 8A with the bumper 806 in the stowed position. FIG. 8D depicts the eighth example portable electronic device 801 of FIG. 8C with the bumper 806 in the deployed position. Similar to the portable electronic device 501 of FIGS. 5A-5B, the bumper 806 is not proud of the second surface 804 in the deployed position. As contrasted with the portable electronic device 501 of FIGS. 5A-5B, the bumper 806 may form a contiguous portion of one or more side surfaces 805, such as a corner, in the stowed position.

Figure 8E:
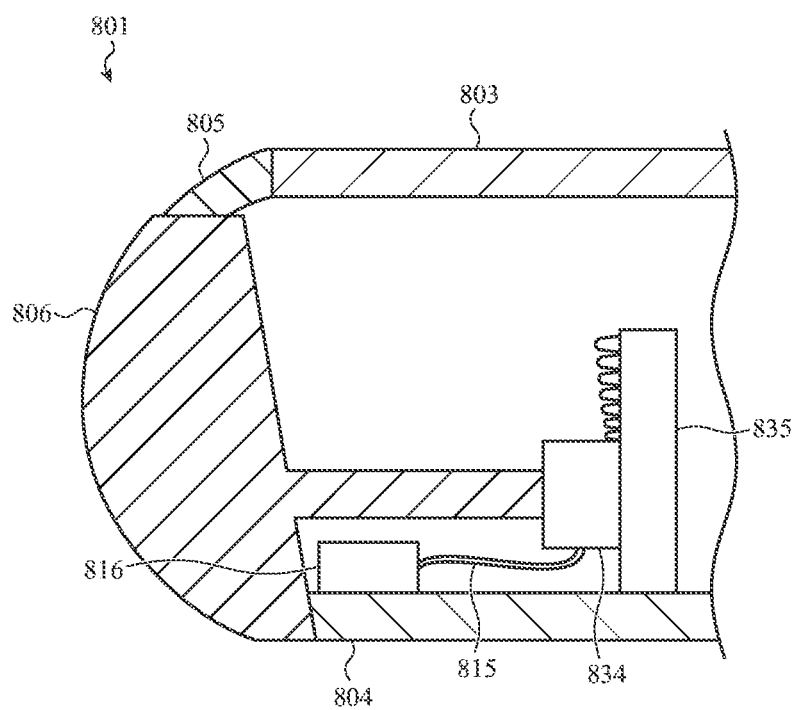
FIG. 8E depicts an example cross-sectional view of an electronic device, taken along line C-C of FIG. 8C, depicting an example activator mechanism assembly in accordance with various embodiments.

FIG. 8E depicts an example cross-sectional view of the portable electronic device 801, taken along line C-C of FIG. 8C, depicting an example activator mechanism assembly in accordance with various embodiments. The activator mechanism assembly includes a geared post 835 and a motor carriage 834 that is fixed to the bumper 806 and operable to travel along the gears of the geared post 835.

A controller 816 may be coupled to the motor carriage 834 via a flex 815 or other connection mechanism. The controller 816 may control the motor carriage 834 to travel up or down (with respect to FIG. 8E) the geared post 835. As the bumper 806 is coupled to the motor carriage 834, travel of the motor carriage 834 up or down the geared post 835 also moves the bumper up (transitioning the bumper 806 to the deployed position) or down (as shown, transitioning the bumper 806 to the stowed position).

For example, FIG. 8E illustrates the bumper 806 in the stowed position. The controller 816 may control the motor carriage 834 to move up the geared post 835. As a result, the bumper 806 would also move up, transitioning the bumper 806 from the stowed position to the deployed position.

Figure 9A:
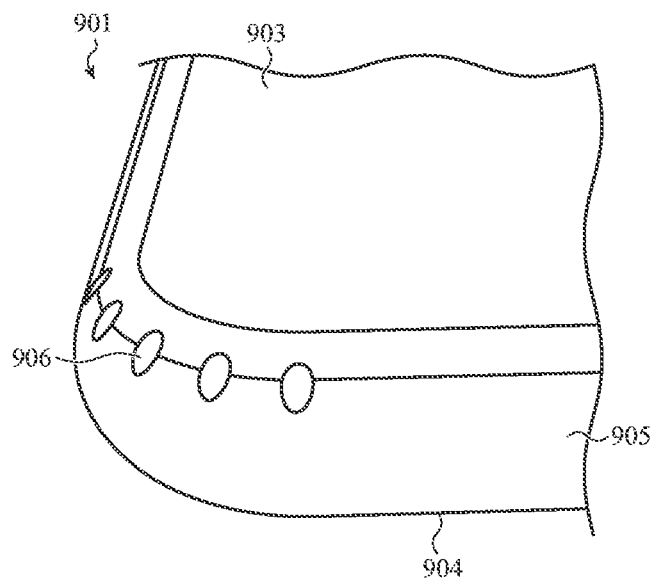
FIG. 9A depicts a partial view of a ninth example portable electronic device showing a bumper in a stowed position.
Figure 9B:
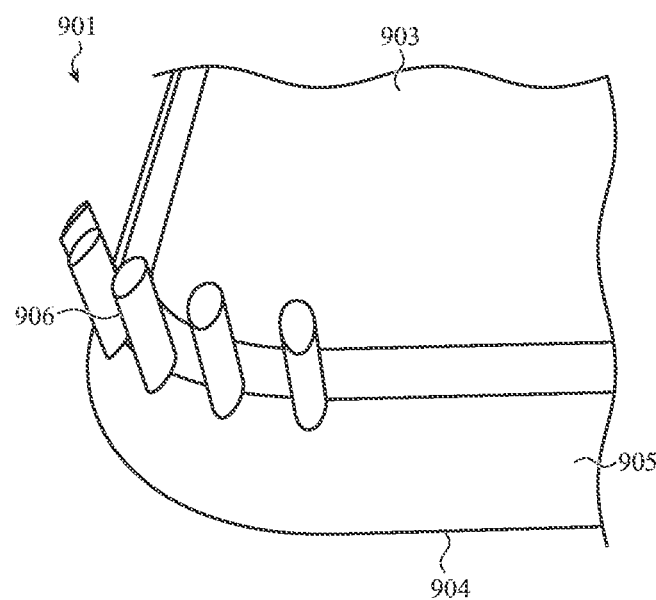
FIG. 9B depicts a partial view of the ninth example portable electronic device of FIG. 9A with the bumper in the deployed position.

FIG. 9A depicts a partial view of a ninth example portable electronic device 901 showing a bumper 906 or protector in a stowed position. FIG. 9B depicts the portable electronic device 901 of FIG. 9A with the bumper 906 in the deployed position. Similar to the portable electronic device 601 of FIGS. 6A-6E, the bumper 906 may not be proud of the first surface 903, one or more side surfaces 905, or the second surface 904 in the stowed position. As contrasted with the portable electronic device 601 of FIGS. 6A-6E, the bumper 906 may be formed from a number of bristles that project proud of the first surface 903 in the deployed position.

In this example, the bristles of the bumper 906 project at an obtuse angle away from the first surface 903. However, in various implementations, the bristles of the bumper 906 may project at any angle, such as an acute angle, over the first surface 903. An obtuse angle may result in the bristles of the bumper 906 contacting a wider surface area of an object impacted by the portable electronic device 901 and/or preventing the bristles of the bumper 906 from being positioned directly between the first surface 903 and the object. By contrast, an acute angle may result in the bristles of the bumper 906 being positioned directly between the first surface 903 and the object.

The bristles of the bumper 906 may be operable to come between the first surface 903 and an object that the first surface 903 impacts. As such, the bristles of the bumper 906 may be formed of a hard material, such as steel or other metal and so on; a soft material, such as rubber, plastic, elastomer, and so on; and/or any other material. Relatively harder materials may prevent the bristles of the bumper 906 from bending far enough to allow the first surface 903 to impact and may resist damage from impact. By contrast, relatively softer materials may absorb more of the impact energy and may, if configured to project over the first surface 903, wrap around the first surface 903 on impact to provide additional protection.

Figure 10A:
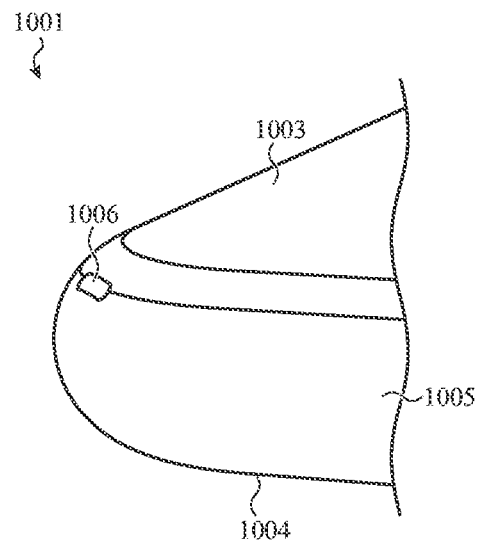
FIG. 10A depicts a partial view of a tenth example portable electronic device showing a bumper in a stowed position.
Figure 10B:
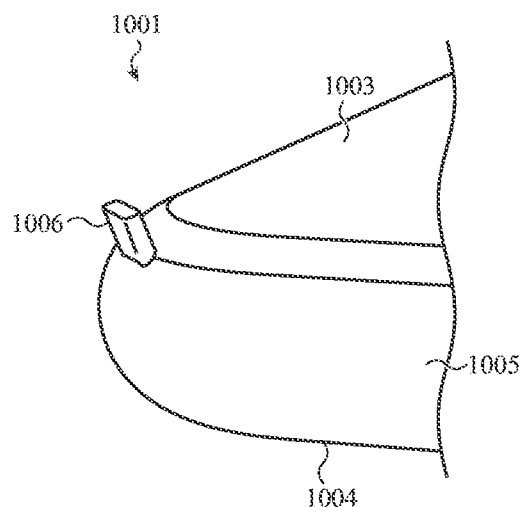
FIG. 10B depicts a partial view of the tenth example portable electronic device of FIG. 10A with the bumper in the deployed position.

FIG. 10A depicts a partial view of a tenth example portable electronic device 1001 showing a bumper 1006 or protector in a stowed position. FIG. 10B depicts the portable electronic device 1001 of FIG. 10A with the bumper 1006 in the deployed position. Similar to the portable electronic device 901 of FIGS. 9A-9B, the bumper 1006 may be a bristle that is not proud of the first surface 1003, one or more side surfaces 1005, or the second surface 1004 in the stowed position and is proud of the first surface 1003 in the deployed position. As contrasted with the portable electronic device 901 of FIGS. 9A-9B, the bumper 1006 may be a single large bristle instead of a number of smaller bristles.

A single large bristle may resist impact force greater than a number of smaller bristles formed from the same material, though may not cover as large an area. Further, a number of smaller bristles allows for the bristles to be oriented in more than one direction, though with less surface area in any particular direction. Additionally, a single large bristle may also allow for use of a less complex activator mechanism.

Figure 11A:
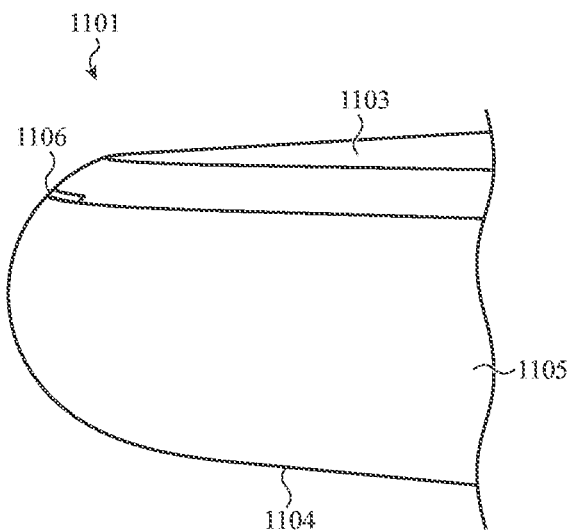
FIG. 11A depicts a partial side view of an eleventh example portable electronic device showing a bumper in a stowed position.
Figure 11B:
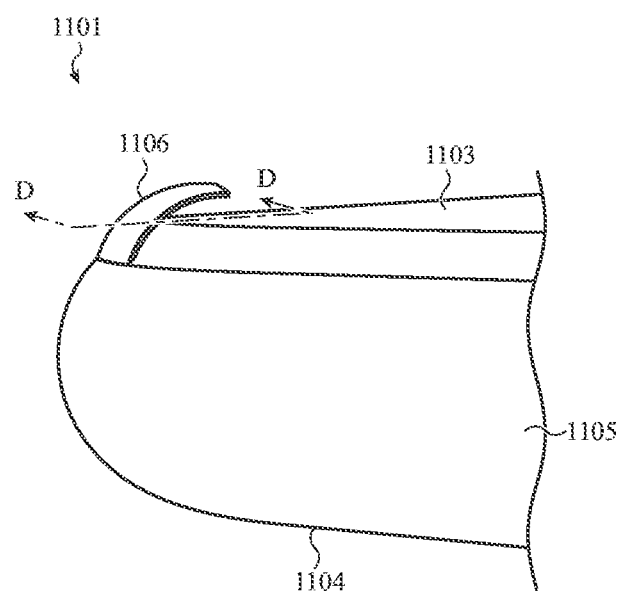
FIG. 11B depicts a partial side view of the eleventh example portable electronic device of FIG. 11A with the bumper in the deployed position.

FIG. 11A depicts a partial side view of an eleventh example portable electronic device 1101 showing a bumper 1106 or protector in a stowed position. FIG. 11B depicts the portable electronic device 1101 of FIG. 11A with the bumper 1106 deployed. Similar to the portable electronic device 1001 of FIGS. 10A-10B, the bumper 1106 may not be proud of the first surface 1103, one or more side surfaces 1105, or the second surface 1104 in the stowed position and be proud of the first surface 1103 in the deployed position. As contrasted with the portable electronic device 1001 of FIGS. 10A-10B, the bumper 1106 may be a thin film that projects over the first surface 1103 in the deployed position. Because the bumper 1106 extends over the first surface 1103, the bumper 1106 may be directly positioned between the first surface 1103 and an object upon impact. The bumper 1106 thus protects the first surface 1103 in a different way than bumpers previously discussed that do not extend over the first surface 1103.

Figure 11C:
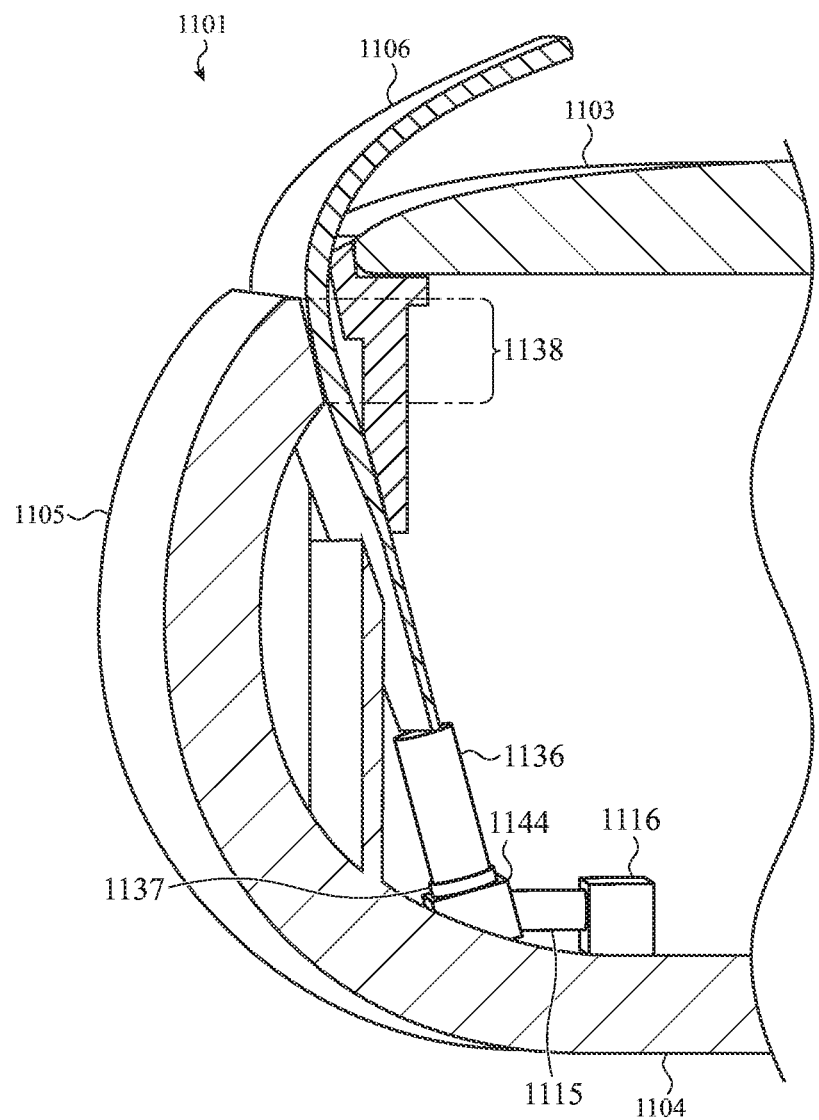
FIG. 11C depicts an example cross-sectional view of an electronic device, taken along line D-D of FIG. 11B, depicting an example activator mechanism assembly in accordance with various embodiments.

FIG. 11C depicts an example cross-sectional view of the portable electronic device 1101 of FIG. 11B, taken along line D-D of FIG. 11B, depicting an example activator mechanism assembly in accordance with various embodiments. This activator mechanism assembly may be used with any other embodiment discussed herein. The activator mechanism assembly includes a pump 1144 (such as an air pump, a liquid pump, and so on) and a pneumatic and/or other electrically-operated cylinder 1137 having a piston 1136 that is operable to extend and/or retract when the pump 1144 (controlled by a controller 1116 that is connected to the pump 1144 by a flex 1115 or other connection mechanism) pumps material (such as air, liquid, and so on) into the pneumatic cylinder 1137. The piston 1136 is coupled to the bumper 1106 such that extension of the piston 1136 by the pneumatic cylinder 1137 caused by the pump 1144 moves the bumper 1106 to transition the bumper 1106 to the deployed position (shown), and retraction of the piston 1136 by the pneumatic cylinder 1137 (such as caused by the pump 1144, the pneumatic cylinder 1137 releasing pressure, and so on) moves the bumper to transition the bumper to the stowed position.

The bumper 1106 may be formed of a soft material in some implementations, such as plastic and so on. To prevent impact from bunching such a soft material bumper 1106, the bumper 1106 may extend through a brace portion 1138 of the housing or other structure such that the brace portion 1138 surrounds an area of the bumper 1106 to prevent such bunching and/or the bumper 1106 otherwise deforming back on itself due to impact. The bumper 1106 may be straight, curved, and so on. The brace portion 1138 may have a corresponding shape to as to surround the area of the bumper 1106 extending through the brace portion 1138, thus enhancing bracing of the bumper 1106.

Although the above describes the bumper 1106 as made of a soft material, it is understood that this is an example. In other implementations, the bumper 1106 may be formed of a hard material, such as steel or other metal, a combination of hard and soft materials (such as a portion that extends from the portable electronic device 1101 in the deployed position being formed of a hard material while a portion that remains within the portable electronic device 1101 in the deployed position being formed of a soft material, a bumper 1106 formed of a soft material having a hard material stiffening member running throughout the soft material, and so on), and so on.

Figure 12A:
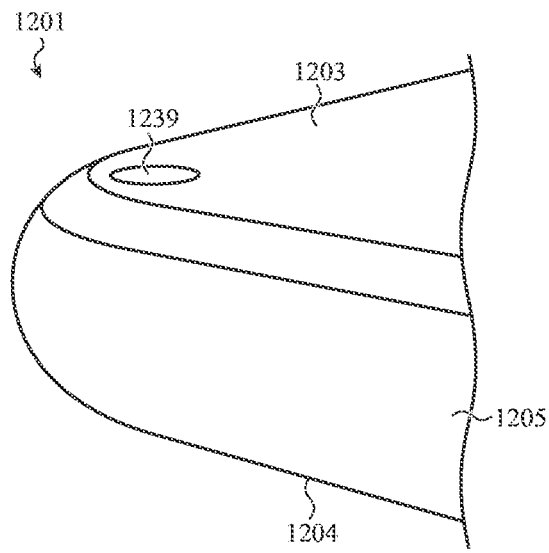
FIG. 12A depicts a partial view of a twelfth example portable electronic device showing a bumper in a stowed position.
Figure 12B:
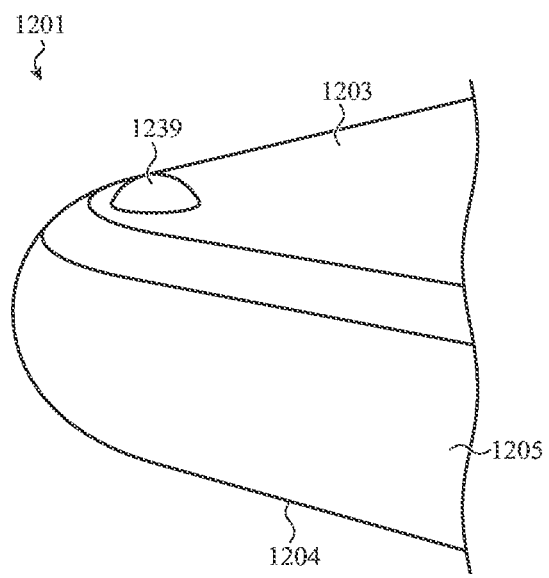
FIG. 12B depicts a partial view of the twelfth example portable electronic device of FIG. 12A with the bumper in the deployed position.

FIG. 12A depicts a partial view of a twelfth example portable electronic device 1201 showing a bumper (obscured by a membrane 1239) in a stowed position. FIG. 12B depicts the portable electronic device 1201 of FIG. 12A with the bumper in the deployed position. Similar to the portable electronic device 701 of FIGS. 7A-7B, a bumper may be positioned in the first surface 1203 rather than the second surface 1204 or a side surface 1205. As contrasted with the portable electronic device 701 of FIGS. 7A-7B, a membrane 1239 may cover the bumper. Projection of the bumper proud of the first surface 1203 in the deployed position also projects at least part of the membrane 1239 proud. Such a membrane 1239 may be used with any of the embodiments discussed herein.

Thus, the membrane 1239 functions as a flexible protector that forms a part of the first surface 1203. This flexible protector is operable to transition between a first state and a second state (e.g., the flexible protector transitions between a stowed position and a deployed position). In the first state, the flexible protector is flush with the first surface 1203 or recessed in the first surface 1203. In the second state, at least part of the flexible protector projects above the first surface 1203. An activator or activator mechanism assembly is operable to transition the flexible protector between the first and second states by transitioning the bumper, which protects the portion of the flexible protector above the surface.

In some implementations, the membrane 1239 may be formed of a variety of materials such as elastomer, rubber, and so on. The membrane 1239 may be coupled to the first surface 1203 or another structure (such as the cushioning element 733 of FIGS. 7A-7B), such as using adhesive. The membrane may form a barrier between the bumper and an external environment, such as a liquid proof and/or resistant barrier.

In other implementations, the membrane 1239 may be formed of a hard material, such as metal. For example, the membrane 1239 may be formed of a series of metal plates coupled to each other to be able to fold in on each other and/or expand outward to project proud of the first surface 1203 in the deployed position and/or not project proud of the first surface 1203 in the stowed position based on movement of a bumper located underneath the membrane 1239.

Although the membrane 1239 is illustrated and described as used with a bumper configured similar to that of the bumper 706 of FIGS. 7A-7B, it is understood that this is an example. Such a membrane 1239 may be used to cover any of the bumpers 106-1106 of FIGS. 1A-11C without departing from the scope of the present disclosure.

Further, although various activator mechanism assemblies are illustrated and described above in the context of FIGS. 1A-12B as being used to transition various respective bumpers 106-1106 from stowed positions to deployed positions, it is understood that these are examples. In various implementations, any of the disclosed activator mechanism assemblies and/or combinations thereof may be configured to be used with any of the portable electronic devices 101-1201 of FIGS. 1A-12B without departing from the scope of the present disclosure. Various activator mechanism assemblies are possible and contemplated.

Additionally, although particular configurations of bumpers 106-1106 are illustrated and described in the context of FIGS. 1A-12B above, it is understood that these are examples and that other configurations are possible without departing from the scope of the present disclosure. For example, fewer than or more than four bumpers 106-1106 may be used in various implementations. By way of another example, bumpers 106-1106 may be configured on various surfaces rather than the first surface 103-1203 and/or one or more side surfaces 105-1205. By way of still another example, one or more bumpers 106-1106 may be configured in positions other than at corners of a portable electronic device 101-1201.

Figure 13:
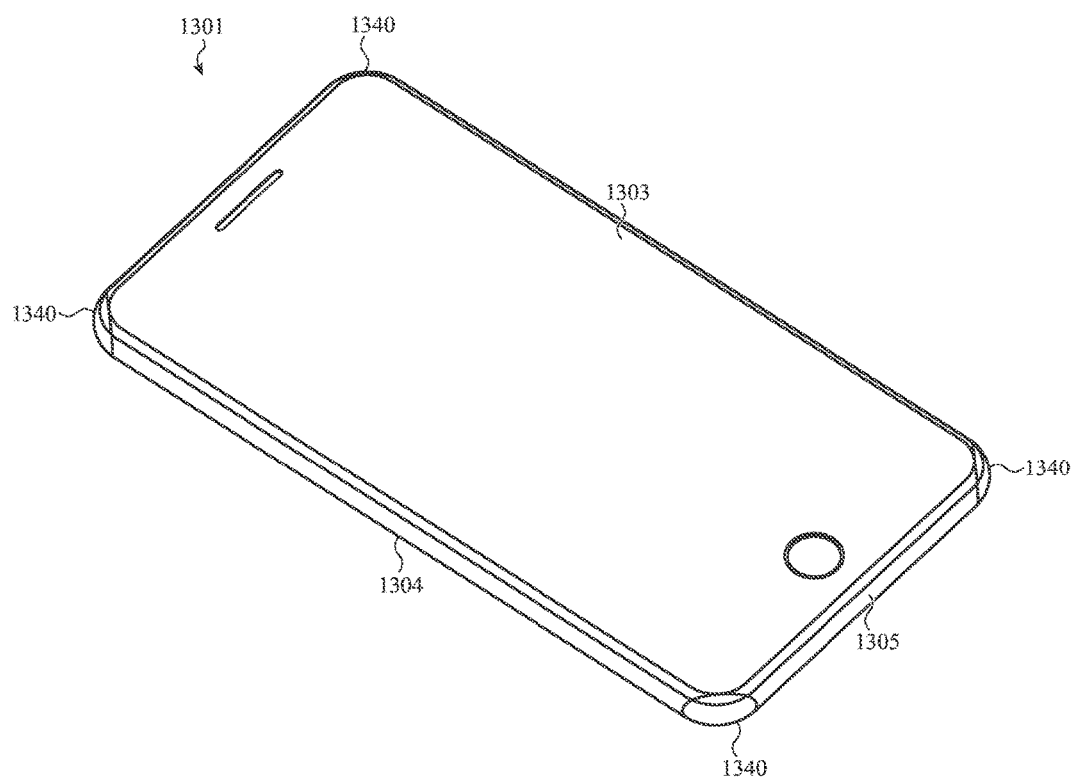
FIG. 13 depicts a view of a thirteenth example portable electronic device having passive bumpers.

FIG. 13 depicts an isometric view of a thirteenth example portable electronic device 1301 having passive bumpers 1340. As contrasted with the bumpers 106-1106 of FIGS. 1A-12B that are actively operable to transition between stowed and deployed positions to protect various surfaces, the passive bumpers 1340 passively protect the first surface 1303, the second surface 1304, and/or one or more side surfaces 1305 by projecting proud of such surfaces without transitioning to another state. The passive bumpers 1340 may be formed of a cushioning material, such as rubber, elastomer, and so on. The passive bumpers 1340 may project proud of the first surface 1303, the second surface 1304, and the side surfaces 1305 at all times.

In various implementations, the passive bumpers 1340 may be coupled to one or more of the first surface 1303, the second surface 1304, and/or one or more side surfaces 1305. For example, one or more adhesives may couple the passive bumpers 1340 to one or more of the first surface 1303, the second surface 1304, and/or one or more side surfaces 1305.

The bumpers 106-1106 and 1340 illustrated and described above in the context of FIGS. 1A-13 have a variety of different shapes. Bumpers, such as the bumpers 106, 206, have an elongated shape in order to fit the respective sides 105, 205 when stowed and project proud of the respective first and second surfaces 103, 203, 104, 204 when rotated approximately 90 degrees. The bumpers 806 also have an elongated shape so as to have a relatively large surface area proud of the first surface 803 when deployed. By contrast, bumpers, such as the bumpers 306, 406, have a non-elongated shape in order to fit the respective sides 305, 405 when stowed and project proud of the respective first surface 303, 403 when rotated approximately 180 degrees. The bumper 506 has a scallop shape in order to rotate around a corner of the portable electronic device 501 and have strength despite a relative thinness. By contrast, the bumpers 606, 706 have various shaped continuous surface areas as they project from a single surface and do not rotate around another surface when deployed. Bumpers formed of multiple bristles, such as the bumper 906, allow the bumpers 906 to project in multiple directions. By contrast, bumpers formed of a single bristle, such as the bumper 1006, have increased strength due to greater thickness despite not projecting in multiple directions. Bumpers formed of films or other thin structures, such as the bumper 1106, may be thinner than other bumpers, but may be able to cover the first surface 1103 and may be strengthened using portions of the housing through which the bumper 1106 projects.

Although the above bumpers 106-1106 and 1340 are illustrated and described above in the context of FIGS. 1A-13 in the context of portable electronic devices 101-1301 that are shown as smart phones, it is understood that this is an example. In various implementations, the portable electronic devices 101-1301 may be any kind of portable electronic devices 101-1301 without departing from the scope of the present disclosure, such as tablet computing devices, mobile computing devices, laptop computing devices, digital media players, electronic accessories, wearable electronic devices, and so on.

Figure 14:
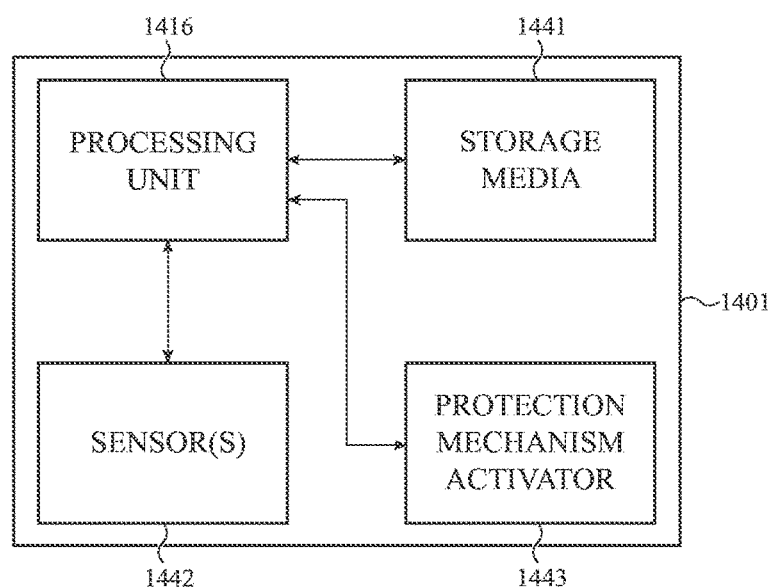
FIG. 14 depicts a block diagram illustrating example components and functional relationships of an example portable electronic device. The example portable electronic device may be one or more of the example portable electronic devices of FIGS. 1A-12B.

FIG. 14 depicts a block diagram illustrating example components and functional relationships of an example portable electronic device 1401. The example portable electronic device 1401 may be one or more of the example portable electronic devices of FIGS. 1A-12B. The portable electronic device 1401 may include one or more processing units 1416, one or more non-transitory storage media 1441 (which may take the form of, but is not limited to, a magnetic storage medium; optical storage medium; magneto-optical storage medium; read only memory; random access memory; erasable programmable memory; flash memory; and so on), one or more sensors 1442 (such as an accelerometer, gyroscope, inertial sensor, motion sensor, camera, and/or other sensor and/or a combination thereof), one or more protection mechanism activators 1443, and so on.

The processing unit 1416 may execute one or more sets of instructions stored in the storage medium 1441 to analyze sensor data from the sensor(s) 1442 to determine whether or not an event such as a drop event, a free fall event, or an impact event occurs. If the processing unit 1416 determines that such an event occurs, the processing unit 1416 may control the protection mechanism activators 1443 (which may include one or more of the activator mechanism assemblies illustrated and described above) to activate one or more bumpers or other active protection mechanisms (such as transitioning one or more bumpers from a stowed position to a deployed position) to protect one or more surfaces of the portable electronic device 1401.

For example, the sensor(s) 1442 may include one or more cameras that capture image data that is analyzed by the processing unit 1416 (such as utilizing motion capture software) to detect the occurrence of such a drop, free fall, impact, or other related event based on determined proximity of the portable electronic device 1401 to a surface (such as increasing proximity compared to previously captured image data), velocity of the portable electronic device 1401, altitude of the portable electronic device 1401, and so on. By way of another example, the sensor(s) 1442 may include one or more accelerometers that capture acceleration data that is analyzed by the processing unit 1416 to detect the occurrence of such an event based on determined acceleration or velocity of the portable electronic device 1401. By way of still another example, the sensor(s) 1442 may include one or more audio components that emit a chirp or ultrasonic pulse and receive a reflection of such from a surface that is analyzed by the processing unit 1416 to detect the occurrence of such an event based on determined height, speed, and so on of the portable electronic device 1401. By way of yet another example, the sensor(s) 1442 may include one or more altitude sensors (such as a global positioning system sensor and/or other kind of sensor operable to detect altitude) that detect altitude data that is analyzed by the processing unit 1416 to detect the occurrence of such an event based on determined altitude, velocity, and so on of the portable electronic device 1401.

Figure 15:
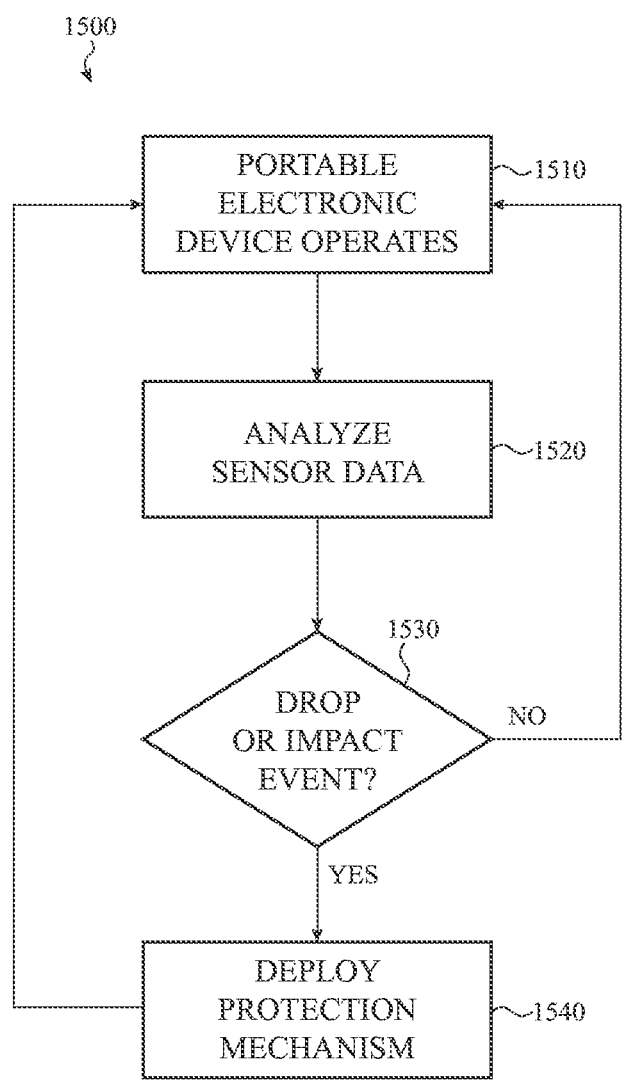
FIG. 15 depicts a flow chart illustrating an example method for protecting a surface of a portable electronic device using an active protection mechanism. This example method may be performed by one or more of the example portable electronic devices of FIGS. 1A-12B and 14.

FIG. 15 depicts a flow chart illustrating an example method 1500 for protecting a surface of a portable electronic device using an active protection mechanism. This example method 1500 may be performed by one or more of the example portable electronic devices 101-1201 and 1401 of FIGS. 1A-12B and 14.

At 1510, a portable electronic device operates. The flow proceeds to 1520 where the portable electronic device analyzes sensor data. Next, the flow proceeds to 1530 where the electronic device determines whether or not an event such as a drop, free fall, impact, or other related event has occurred based on the analysis of the sensor data.

If so, the flow proceeds to 1540. Otherwise, the flow returns to 1510 where the portable electronic device continues to operate.

At 1540, after the portable electronic device determines that an event such as a drop, free fall, impact, or other related event has occurred, the portable electronic device deploys one or more active protection mechanisms. Such active protection mechanisms may be one or more of the bumpers 106-1106 of FIGS. 1A-12. The flow then returns to 1510 where the portable electronic device continues to operate.

Although the example method 1500 is illustrated and described as including particular operations performed in a particular order, it is understood that this is an example. In various implementations, various orders of the same, similar, and/or different operations may be performed without departing from the scope of the present disclosure.

For example, the example method 1500 is illustrated and described as analyzing sensor data and determining whether or not an event, such as a drop, free fall, impact, or other related event, has occurred at 1520-1530 as separate, linearly performed operations. However, in various implementations, such operations may be performed as part of a unified operation. Various configurations are possible and contemplated.

As described above and illustrated in the accompanying figures, the present disclosure relates to active protection mechanisms for portable electronic devices. A portable electronic device uses an activator mechanism assembly to deploy bumpers upon detection of a drop event, free fall, or impact. The bumpers are proud of one or more surfaces of the electronic device when deployed, but not when stowed. The bumpers may form side corners or portions of other surfaces of the portable electronic device in the stowed position. In moving from the stowed position to the deployed position, the bumpers may rotate and/or translate. In some implementations, the bumpers may be covered by a membrane that blocks passage of contaminants from an external environment.

In the present disclosure, the methods disclosed may be implemented as sets of instructions or software readable by a device. Such instructions or software may be provided as a computer program product including a non-transitory machine-readable medium that may be used to program a computer system (or other electronic devices) to perform the method. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A portable electronic device, comprising:
   a first surface;
   a second surface opposite the first surface;
   a side surface positioned between the first surface and the second surface;
   a bumper, coupled to the side surface, operable to transition between a stowed position in which the first surface is proud of the bumper and a deployed position in which a portion of the bumper is proud of the first surface, wherein an additional portion of the bumper is proud of the second surface in the deployed position; and
   an activator mechanism assembly that rotates the bumper and translates the bumper away from the side surface while transitioning the bumper from the stowed position to the deployed position, wherein the activator mechanism assembly rotates the bumper more than 45 degrees about an axis parallel to the first surface.

2. A portable electronic device, comprising:
   a first surface;
   a second surface opposite the first surface;
   a side surface positioned between the first surface and the second surface;
   a bumper, coupled to the side surface, operable to transition between a stowed position in which the first surface is proud of the bumper and a deployed position in which a portion of the bumper is proud of the first surface, wherein the second surface is proud of the bumper in the stowed position and the deployed position; and
   an activator mechanism assembly that rotates the bumper and translates the bumper away from the side surface while transitioning the bumper from the stowed position to the deployed position, wherein the activator mechanism assembly is operable to rotate the bumper more than 90 degrees about an axis transverse to the first surface.

3. The portable electronic device of claim 1, wherein the activator mechanism assembly comprises:
   a restraining mechanism; and
   a torsion spring operable to move the bumper when the restraining mechanism releases the torsion spring.

4. The portable electronic device of claim 3, wherein the activator mechanism assembly further comprises:
   a cam coupled to the bumper; and
   a cam follower; wherein the cam is operable to move along the cam follower to translate the bumper when the bumper is rotated.

5. The portable electronic device of claim 3, wherein the restraining mechanism includes:
   a first magnet coupled to the torsion spring;
   an electronically controllable electromagnetic coil; and
   a second magnet coupled to the electronically controllable electromagnetic coil; wherein
   the electronically controllable electromagnetic coil is operable to alter magnetic force between the first magnet and the second magnet in order to release the torsion spring.

6. The portable electronic device of claim 3, wherein the restraining mechanism includes:
   a catch component coupled to the torsion spring; and
   a detent that is biased to engage the catch component; wherein
   the torsion spring is released when the detent disengages from the catch component.

7. A portable electronic device, comprising:
   a surface;
   a bumper;
   a flexible protector that forms a part of the surface and is operable to transition between a first state where the flexible protector is flush with the surface or recessed with respect to the surface and a second state where at least a portion of the flexible protector projects above the surface, wherein the flexible protector is a membrane that covers the bumper; and
   an activator mechanism assembly operable to move the bumper and to transition the flexible protector between the first and second states.

8. The portable electronic device of claim 7, wherein the activator mechanism assembly comprises:
   a moving component operable to slide along a ramp, thereby transitioning the flexible protector between the first and second states;
   a magnet; and
   an electronically controllable electromagnetic coil; wherein
   the moving component slides along the ramp in response to a change in magnetic force between the magnet and the electronically controllable electromagnetic coil.

9. The portable electronic device of claim 7, wherein the surface includes a cover glass and the flexible protector is positioned within an area defined by the cover glass.

10. The portable electronic device of claim 7, wherein the surface includes a cover glass and the flexible protector is positioned outside the cover glass.

11. The portable electronic device of claim 7, wherein the activator mechanism assembly comprises:
   a pump; and
   an electrically-operated cylinder coupled to the flexible protector via a piston;
   wherein the flexible protector transitions:
   from the first state to the second state when the pump causes the electrically-operated cylinder to extend the piston; and
   from the second state to the first state when the electrically-operated cylinder retracts the piston.

12. A portable electronic device, comprising:
- a first surface;
- a second surface adjacent to the first surface;
- a protector configured to rotate on the second surface between a retracted position in which the first surface is proud of the protector and an extended position in which at least part of the protector is proud of the first surface; and
- an activator operable to rotate the protector between the retracted position and the extended position, wherein the activator comprises a magnet and an electromagnetic coil configured to change polarity, and wherein the activator is configured to rotate when the electromagnetic coil changes polarity.

13. The portable electronic device of claim 12, wherein the protector forms a portion of the second surface in the retracted position.

14. The portable electronic device of claim 13, wherein the protector forms a corner of the portable electronic device in the retracted position.

15. The portable electronic device of claim 12, wherein the electronically controllable electromagnetic coil is operable to alternate polarity to rotate the protector.

16. The portable electronic device of claim 12, wherein the protector comprises metal.

* * * * *